United States Patent
Yajima

(10) Patent No.: US 7,911,094 B2
(45) Date of Patent: Mar. 22, 2011

(54) STEPPING MOTOR

(75) Inventor: Katsuhide Yajima, Nagano (JP)

(73) Assignee: Nidec Sankyo Corporation (JP)

( * ) Notice: Subject to any disclaimer, the term of this patent is extended or adjusted under 35 U.S.C. 154(b) by 289 days.

(21) Appl. No.: 12/202,819

(22) Filed: Sep. 2, 2008

(65) Prior Publication Data

US 2009/0058233 A1  Mar. 5, 2009

(30) Foreign Application Priority Data

Aug. 31, 2007 (JP) ................... 2007-225024
Aug. 31, 2007 (JP) ................... 2007-225025

(51) Int. Cl.
*H02K 11/00* (2006.01)
*H02K 37/00* (2006.01)
*G04C 13/11* (2006.01)

(52) U.S. Cl. ............ 310/71; 310/49 R; 310/49.01

(58) Field of Classification Search ......... 310/40 R, 310/49.01, 71, 49 R; G04C 13/11; H02K 37/00, H02K 11/00
See application file for complete search history.

(56) References Cited

U.S. PATENT DOCUMENTS

| | | | | |
|---|---|---|---|---|
| 5,004,941 A * | 4/1991 | Ohzeki et al. | .............. | 310/49.13 |
| 5,389,846 A * | 2/1995 | Okazaki et al. | ......... | 310/40 MM |
| 5,912,517 A * | 6/1999 | Nishimura et al. | ............. | 310/71 |
| 7,446,442 B2 * | 11/2008 | Horiike | ....................... | 310/49.07 |
| 2005/0006960 A1 * | 1/2005 | Matsushita et al. | ......... | 310/49 R |
| 2005/0236914 A1 * | 10/2005 | Horiike | ....................... | 310/49 R |
| 2005/0264113 A1 * | 12/2005 | Suzuki et al. | .................... | 310/80 |
| 2006/0261684 A1 * | 11/2006 | Sonohara et al. | ........... | 310/49 R |
| 2007/0224858 A1 * | 9/2007 | Sonohara | ...................... | 439/100 |
| 2007/0296294 A1 * | 12/2007 | Nobe et al. | ....................... | 310/90 |
| 2008/0048508 A1 * | 2/2008 | Shimoyama | ..................... | 310/43 |
| 2008/0084131 A1 * | 4/2008 | Yamawaki et al. | ............ | 310/89 |
| 2008/0191566 A1 * | 8/2008 | Lin et al. | ......................... | 310/71 |
| 2008/0252181 A1 * | 10/2008 | Suzuki et al. | ............... | 310/49 R |
| 2009/0058233 A1 * | 3/2009 | Yajima | ....................... | 310/49 R |

FOREIGN PATENT DOCUMENTS

JP  2000-102204  4/2000
JP  2006-280035  10/2006

* cited by examiner

*Primary Examiner* — Quyen Leung
*Assistant Examiner* — John K Kim
(74) *Attorney, Agent, or Firm* — Cantor Colburn LLP

(57) ABSTRACT

A stepping motor may include a rotor having a rotation shaft and a permanent magnet, a stator provided with a stator core formed with a flange part and pole teeth, a drive coil and a terminal block disposed on an outer peripheral side of the stator. The flange part of the stator core may be provided with a terminal block holding part and the terminal block holding part is formed with a first holding part, which is formed to be bent from the flange part and extended in an axial direction of a motor, for supporting a bottom face of the terminal block. Further, a plurality of terminal pins may be arranged in the terminal block so that a plurality of the terminal pins is disposed in the terminal block along an axial direction of the rotation shaft.

22 Claims, 17 Drawing Sheets

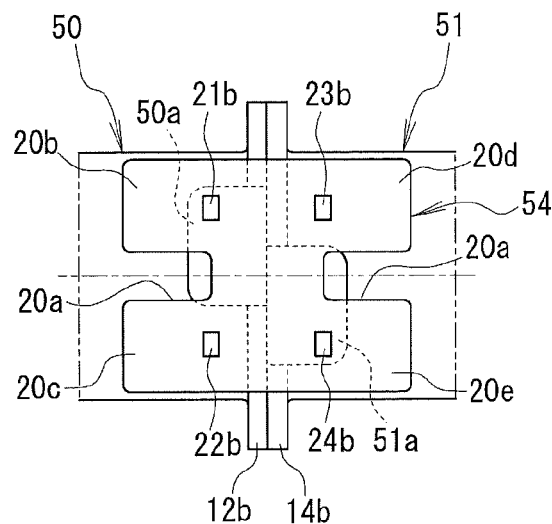
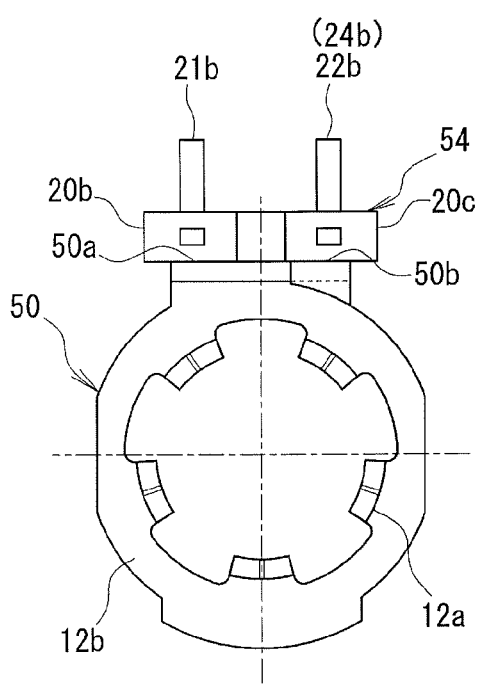
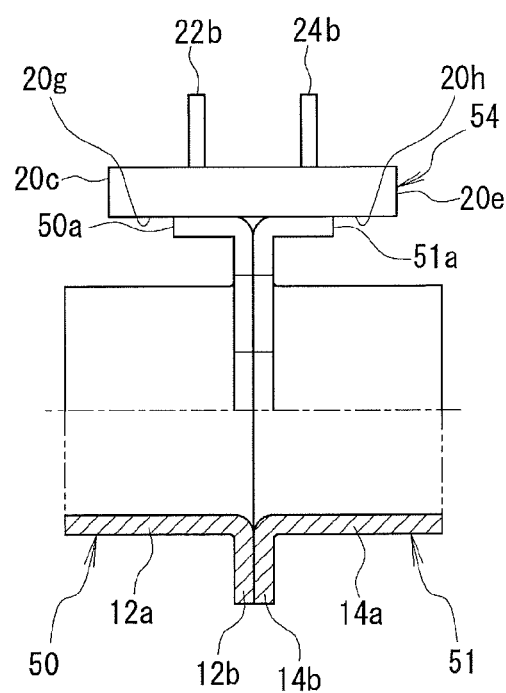
Fig. 8(a)
Fig. 8(b)
Fig. 8(c)

STEPPING MOTOR

CROSS REFERENCE TO RELATED APPLICATION

The present invention claims priority under 35 U.S.C. §119 to Japanese Application No. 2007-225024 filed Aug. 31, 2007 and Japanese Application No. 2007-225025 filed Aug. 31, 2007, both of which are incorporated herein by reference.

FIELD OF THE INVENTION

At least an embodiment of the present invention may relate to a stepping motor which is provided with a terminal block.

BACKGROUND OF THE INVENTION

Conventionally, in a small-sized stepping motor 60 as shown in FIG. 16(a), a terminal block 62 which is made of resin material and provided with a plurality of terminal pins 61 is mounted on an outer peripheral side of a stepping motor 60. Winding ends of coils 63 and 64 are wound and connected with the terminal pins 61.

A fitting aperture 62a is formed to open at a center of the terminal block 62. Holding parts 65b and 66b extended toward an outer peripheral side from flange parts 65a and 66a of stator cores 65 and 66 which are disposed on each other in a back to back manner are fitted into the fitting aperture 62a and, as a result, the terminal block 62 is fixed to the stator cores 65 and 66. FIG. 16(b) is a top plan view and FIG. 16(c) is a front view respectively showing the stator cores 65 and 66 in a state where the terminal block 62 is fixed to the stator cores 65 and 66 (see Japanese Patent Laid-Open No. 2006-280035).

Further, another conventional stepping motor is provided with a terminal block on its outer peripheral side and a plurality of terminal pins around which winding ends of a coil are wound is provided in the terminal block. The terminal pins are arranged side by side in a direction perpendicular to an output shaft of the stepping motor (see Japanese Patent Laid-Open No. 2000-102204).

However, in the former stepping motor, as shown in FIGS. 16(a) through 16(c), the terminal block 62 is structured so that it is fixed to the stator cores 65 and 66 only by fitting the terminal block 62 to the holding parts 65b and 66b which are formed in the flange parts 65a and 66a of the stator cores 65 and 66. Therefore, the terminal block 62 may be carelessly or easily inclined. In this case, for example, when a flexible circuit board is to be mounted on the terminal block 62 and the terminal pins 61 are connected to circuit patterns of the flexible circuit board, connecting work becomes difficult.

Further, in the latter stepping motor, as a diameter of the motor becomes smaller, a distance between the terminal pins becomes narrower. However, when the size of the terminal block is reduced as the size of the stepping motor is reduced, a nozzle of an automatic coil winding machine for winding a coil cannot pass through between the terminal pins and thus a winding end of the coil can not be wound around the terminal pin automatically. Therefore, since downsizing of the terminal block is not attained, the size of the stepping motor is not reduced.

Further, when a distance between the terminal pins becomes narrow, a land having a size required to apply solder cannot be formed on a power feeding circuit board (flexible circuit board) to which the terminal pins are connected.

In order to solve the problem, as shown in FIG. 17(a), it is conceivable that, when terminal pins 501a through 501d are disposed in two lines in a direction perpendicular to an output shaft X of a stepping motor 500, a desired distance can be secured between the terminal pins 501a through 501d. However, when this arrangement is employed, as shown in FIG. 17(b), a power feeding circuit board 510 connected with the terminal pins 501a through 501d is protruded toward a longitudinal direction of a motor main body part (stator) 502 (see the slanted line portion in FIG. 17(b)). Therefore, a space required to mount the stepping motor 500 becomes larger.

SUMMARY OF THE INVENTION

In view of the problems described above, at least an embodiment of the present invention may advantageously provide a stepping motor which is capable of preventing inclination of a terminal block that is disposed on an outer peripheral side of the stepping motor.

Further, at least another embodiment of the present invention may advantageously provide a stepping motor which is capable of securing a sufficient distance between a plurality of terminal pins that are arranged in a terminal block. Further, at least another embodiment of the present invention may advantageously provide a stepping motor whose mounting space is not required to be reduced due to a power supply board which is connected to the terminal pins.

Thus, according to at least an embodiment of the present invention, there may be provided a stepping motor including a rotor having a rotation shaft and a permanent magnet provided on an outer periphery of the rotation shaft, a stator provided with a stator core which is formed with a flange part and pole teeth, a drive coil which is disposed on an outer peripheral side of the pole teeth, and a terminal block which is disposed on an outer peripheral side of the stator. The flange part of the stator core is provided with a terminal block holding part for holding the terminal block, and the terminal block holding part is formed with a first holding part, which is formed to be bent from the flange part and extended in an axial direction of a motor, for supporting a bottom face of the terminal block.

According to the embodiment of the present invention, the terminal block holding part which is provided in the flange part of the stator core is formed with a first holding part, which is formed to be bent from the flange part and extended in an axial direction of a motor, for supporting a bottom face of the terminal block. Therefore, inclination of the terminal block, especially inclination in the axial direction of the terminal block is prevented by the first holding part. For example, even when working is performed in which a flexible circuit board is placed and connected to the terminal block, a force applied to the terminal block is supported by the first holding part and thus the working of placing and connecting the flexible circuit board on and to the terminal block can be easily performed.

In this case, it is preferable that the terminal block holding part is formed with a second holding part which is extended from the flange part in a direction crossing the axial direction for supporting the terminal block. According to this structure, the terminal block is firmly fixed to the terminal block holding part and thus inclination of the terminal block is prevented. In accordance with at least an embodiment of the present invention, the first holding part and/or the second holding part are formed in a flat plate shape. According to this structure, the first holding part and the second holding part are easily formed in the flange part of the stator core and the terminal block can be supported by the face of the flat plate.

In accordance with at least an embodiment of the present invention, the first holding part and the second holding part are formed on the same side of the flange part, and the second holding part is formed on a center side of the terminal block holding part, and the first holding part is formed to be bent in the axial direction of the motor at a position which is different from the second holding part in a circumferential direction. According to this structure, the terminal block can be stably fixed to the first holding part and the second holding part. In addition, since a distance between the first holding part and the second holding part can be increased, when a coil end drawn from the drive coil is wound around the terminal pin provided in the terminal block, winding work of the coil end around the terminal pin is easily performed without being interfered by the first holding part.

Further, in accordance with at least an embodiment of the present invention, the terminal block is formed with an engaging hole into which the second holding part is fitted, and the terminal block is mounted on the flange part of the stator core in a state that the first holding part abuts with the bottom face of the terminal block and the bottom face of the terminal block is supported by the first holding part when the second holding part is engaged with the engaging hole. According to this structure, fixing work of the terminal block to the terminal block holding part is easily performed. Further, fixing of the terminal block is stable in comparison with a case where the terminal block is supported only by the first holding part.

Further, in accordance with at least an embodiment of the present invention, a stepped part is formed in the terminal block holding part near the second holding part, and a tip end position of the stepped part is set at a position for supporting the bottom face of the terminal block together with the first holding part. According to this structure, the bottom face of the terminal block can be held by both the first holding part and the stepped part. Therefore, inclination of the terminal block and, especially, inclination in the axial direction and the radial direction of the stator is further prevented.

Further, in accordance with at least an embodiment of the present invention, the first holding part of the terminal block holding part is extended from the flange part in the same direction as the pole teeth. According to this structure, working for bending the pole teeth in the stator core and working for bending the first holding part from the flange part can be performed simultaneously and thus workability of the stator core provided with the first holding part is improved.

Further, in accordance with at least an embodiment of the present invention, the stator comprises two stator assemblies, and the terminal block holding part provided with the first holding part is formed in the respective flange parts of the stator cores of the two stator assemblies. According to this structure, the terminal block is prevented from being inclined by the first holding parts of the terminal block holding parts formed in the respective flange parts of the two stator cores. In this case, it is preferable that each of the two stator assemblies comprises an inner stator core and an outer stator core which sandwiches the drive coil with the inner stator core, two inner stator cores are disposed on each other in a back-to-back manner, and each of the two inner stator cores is formed with the first holding part and the second holding part which is extended from the flange part in a direction crossing the axial direction for supporting the terminal block.

Further, in accordance with at least an embodiment of the present invention, an engaging hole into which the second holding parts provided in the two inner stator cores are fitted is formed at a center of the terminal block, coil winding parts of a plurality of terminal pins, which are connected to the drive coils of the two stator assemblies, are provided on both side positions in the axial direction of the engaging hole in the terminal block, when the two inner stator cores are disposed on each other in the back-to-back manner, the second holding parts formed in the respective two inner stator cores structure one second holding part to be fitted into the engaging hole of the terminal block, and the first holding parts formed in the two inner stator cores are respectively formed in opposite directions to each other in the axial direction so as to interpose the second holding part, and the bottom face of the terminal block is supported by the two first holding parts at both side positions in the axial direction of the engaging hole of the terminal block. According to this structure, one terminal block is provided for the two stator assemblies, and the terminal block is structured so that its bottom face is supported by the first holding parts provided in the respective two inner stator cores at two positions in the axial direction and thus inclination in the axial direction of the terminal block can be prevented in a simple structure.

In this case, it is preferable that the first holding part which is provided in each of the two inner stator cores is extended to a position of the coil winding part of the terminal pin which is provided on both side positions in the axial direction of the engaging hole. Further, it is preferable that a tip end in the axial direction of the first holding part is extended on an outer side in the axial direction of the coil winding part of the terminal pin, and the first holding part is formed so as to support of the terminal block at an outer side position of the coil winding part in a circumferential direction. According to this structure, the bottom face of the terminal block can be supported over a wide area by the first holding parts provided in each of the two inner stator cores and thus the bottom face of the terminal block can be stably supported and inclination can be prevented.

Further, according to at least an embodiment of the present invention, there may be provided a stepping motor including a rotor having a rotation shaft and a permanent magnet provided on an outer periphery of the rotation shaft, a stator provided with a stator core which is formed with pole teeth, a drive coil which is disposed on an outer periphery of the pole teeth, a terminal block which is disposed on an outer peripheral side of the stator, and a plurality of terminal pins which are arranged in the terminal block. A plurality of the terminal pins comprises a first terminal pin around which one end of the drive coil is wound and a second terminal pin around which the other end of the drive coil is wound, and the first terminal pin and the second terminal pin are disposed in the terminal block along an axial direction of the rotation shaft.

According to the embodiment of the present invention, the terminal pins are disposed along the axial direction of the rotation shaft of the stepping motor and thus sufficient distances can be secured between the first terminal pin and the second terminal pins. Therefore, a malfunction is prevented where a nozzle of an automatic coil winding machine for winding a coil end of the drive coil around the terminal pin can not pass through between the terminal pins or, where a space for forming a land having a size required to apply solder can not be secured on a flexible circuit board which is connected to the terminal pins.

In this case, it is preferable that the first terminal pin and the second terminal pin are disposed at different positions in a direction perpendicular to the axial direction of the rotation shaft. According to this structure, a distance between the first terminal pin and the second terminal pin can be further increased. Further, in order to further increase a distance between the first terminal pin and the second terminal pin, it is preferable that the first terminal pin and the second terminal pin are disposed at different positions in the direction perpendicular to the axial direction of the rotation shaft so as to interpose the axial line of the rotation shaft therebetween.

Further, in accordance with at least an embodiment of the present invention, the terminal block is formed on its peripheral portion with a first cut-out part corresponding to the first terminal pin and a second cut-out part corresponding to the second terminal pin, the first cut-out part and the second cut-out part are formed in the terminal block at neighboring positions of the corresponding terminal pins in the direction perpendicular to the axial direction of the rotation shaft, and the one end of the drive coil is drawn through the first cut-out part and wound around the first terminal pin and the other end of the drive coil is drawn through the second cut-out part and wound around the second terminal pin. According to this structure, a wire for forming the drive coil can be wound around the terminal pin through the cut-out part of the terminal block and thus winding work of the coil end around the terminal pin becomes easy and the coil end can be firmly wound around the terminal pin. Further, since one coil end and the other coil end do not cross each other, disconnection and short circuit of the coil end can be prevented.

In this case, it is preferable that the first cut-out part and the second cut-out part are formed in a tapered shape becoming narrower from the peripheral portion of the terminal block toward the terminal pin. According to this structure, the wire forming the drive coil is easily engaged with the cut-out part. Further, the tapered shape of the cut-out part becoming narrower is formed toward the terminal pin and thus workability of winding work of the coil end around the terminal pin is improved and, as a result, disconnection of the coil end can be prevented.

Further, in accordance with at least an embodiment of the present invention, the first terminal pin and the second terminal pin are disposed at different positions in the direction perpendicular to the axial direction of the rotation shaft so as to interpose the axial line of the rotation shaft therebetween, the first cut-out part and the second cut-out part formed in the terminal block are cut in opposite directions to each other in a circumferential direction at the positions corresponding to the first terminal pin and the second terminal pin, and the one end and the other end of the drive coil are drawn in the opposite directions to each other in the circumferential direction to be wound around the first terminal pin and the second terminal pin. According to this structure, when the respective coil ends are to be wound around the terminal pins, the respective coil ends do not contact with or cross each other and thus disconnection of the coil end or short circuit due to contacting with each other can be prevented.

Further, in accordance with at least an embodiment of the present invention, the first terminal pin is located on an output side of the second terminal pin, and the first terminal pin and the second terminal pin are connected to a power supply board on which a first pin connection hole and a second pin connection hole are formed at positions corresponding to the first terminal pin and the second terminal pin, and a distance between an end face on an output side of the power supply board in the axial direction of the rotation shaft and the first pin connection hole, and a distance between an end face on an opposite-to-output side of the power supply board and the second pin connection hole are set to be smaller than a distance between an end face on an output side of the stator and the first terminal pin, and a distance between an end face on an opposite-to-output side of the stator and the second terminal pin. According to this structure, the power supply board mounted on the stepping motor does not protrude from the stator, and thus mounting space for the stepping motor is prevented from becoming larger due to the power supply board and the size of a device on which the stepping motor is mounted can be reduced.

Further, in accordance with at least an embodiment of the present invention, a terminal block holding part for holding the terminal block is formed in the stator core and the terminal block holding part is extended from an outer peripheral part of the stator in the axial direction of the rotation shaft so as to abut with a bottom face of the terminal block to prevent inclination in the axial direction of the terminal block. According to this structure, inclination of the terminal block, especially inclination of the terminal block in the axial direction of the rotation shaft and inclination in the radial direction of the stator are prevented and working in which the power supply board is placed on and connected with the terminal block are easily performed.

Further, in accordance with at least an embodiment of the present invention, the stator comprises two stator assemblies, and the first terminal pin and the second terminal pin arranged in one of the two stator assemblies, and the first terminal pin and the second terminal pin arranged in the other of the two stator assemblies are respectively disposed in the terminal block along the axial direction of the rotation shaft. According to this structure, even in the stepping motor having two-phase stator, a larger distance is secured between the respective terminal pins.

In this case, it is preferable that the first terminal pin and the second terminal pin arranged in the one of the two stator assemblies, and the first terminal pin and the second terminal pin arranged in the other of the two stator assemblies are disposed at different positions in a direction perpendicular to the axial direction of the rotation shaft. Specifically, the first terminal pins and the second terminal pins of the two stator assemblies are respectively disposed at different positions in the direction perpendicular to the axial direction of the rotation shaft so as to interpose the axial line of the rotation shaft therebetween. According to this structure, in the stepping motor having a two-phase stator, a distance between the first terminal pin and the second terminal pin can be increased.

Further, in accordance with at least an embodiment of the present invention, the terminal block is formed of a first terminal block, which is disposed in the one of the two stator assemblies, and a second terminal block which is disposed in the other of the two stator assemblies, and the first terminal block and the second terminal block are formed separately from each other. According to this structure, even when another member such as a coil bobbin is disposed on an outer periphery of the pole teeth and on an inner periphery of the drive coil, the terminal pins can be arranged along the axial direction of the rotation shaft of the stepping motor. Further, assembling of the stepping motor becomes easy and its manufacturing cost can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8(a) is a top plan view showing a state where a terminal block is fixed to flange parts of the inner stator cores in the second modified example, FIG. 8(b) is its side view, and FIG. 8(c) is its partly cross sectional front view.

DETAILED DESCRIPTION OF THE PREFERRED EMBODIMENTS

First Embodiment

Figure 1:
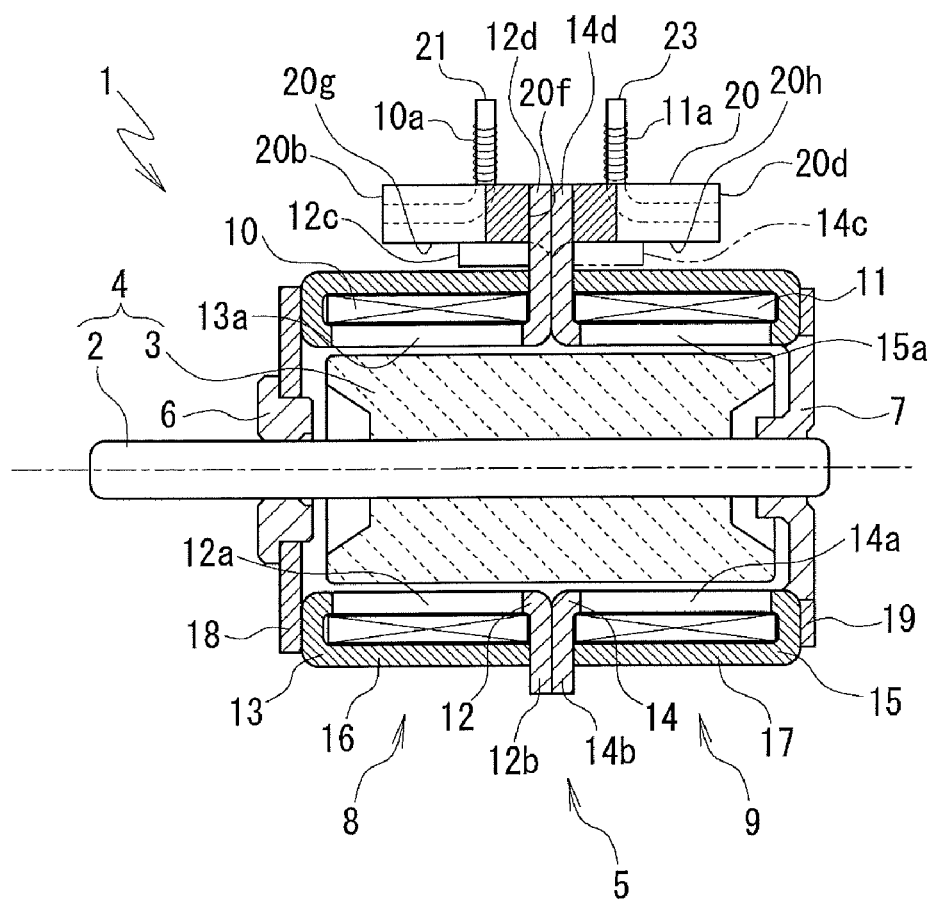
FIG. 1 is a cross sectional side view showing a schematic structure of a stepping motor in accordance with a first embodiment of the present invention.
Figure 2A:
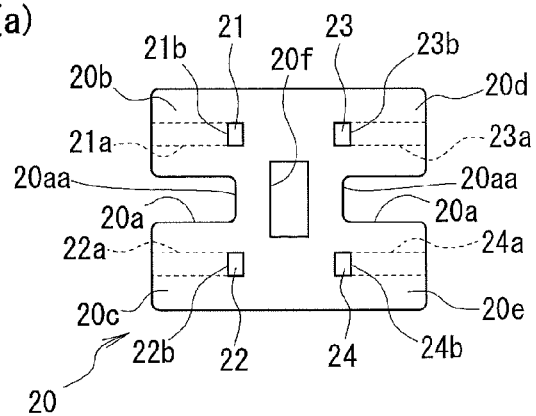
FIG. 2(*a*) is a top plan view showing a terminal block, FIG. 2(*b*) is its side view and FIG. 2(*c*) is its front view.
Figure 2B:
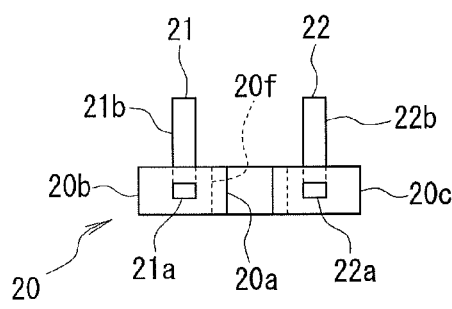
Figure 2C:
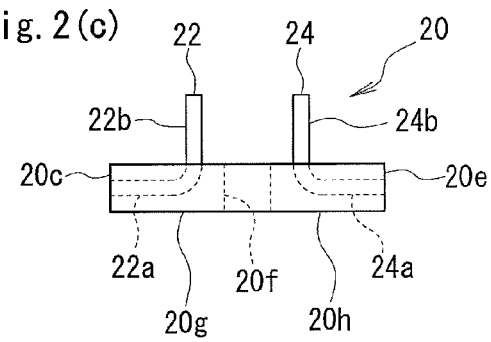
Figure 3A:
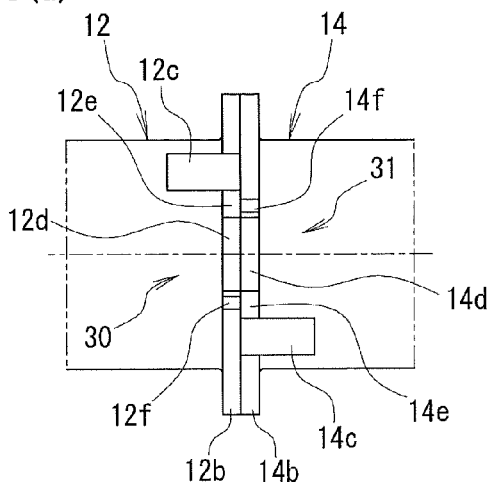
FIG. 3(a) is a top plan view showing inner stator cores.
Figure 3B:
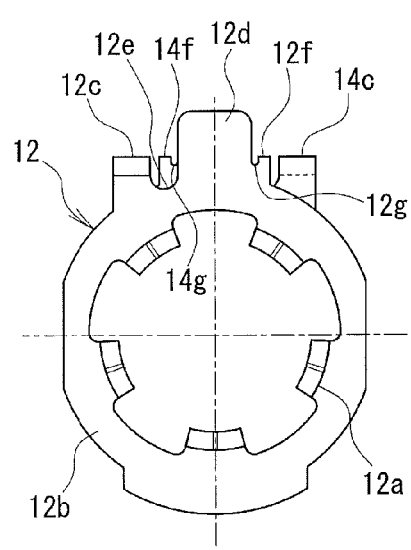
FIG. 3(b) is its side view and FIG. 3(c) is its partly cross sectional front view.
Figure 3C:
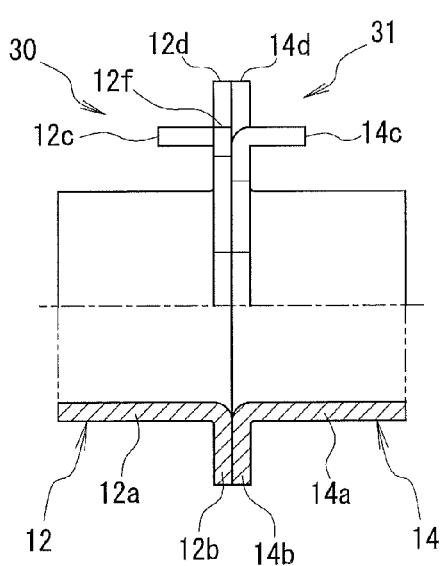
Figure 4A:
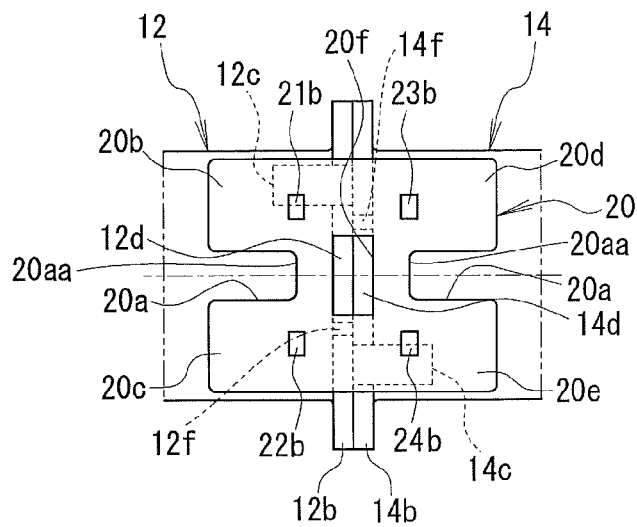
FIG. 4(a) is a top plan view showing a state where a terminal block is fixed to flange parts of the inner stator cores.
Figure 4B:
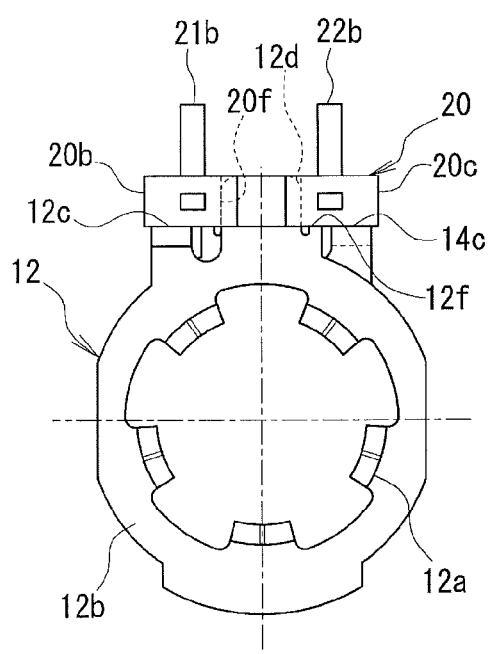
FIG. 4(b) is its side view and FIG. 4(c) is its partly cross sectional front view.
Figure 4C:
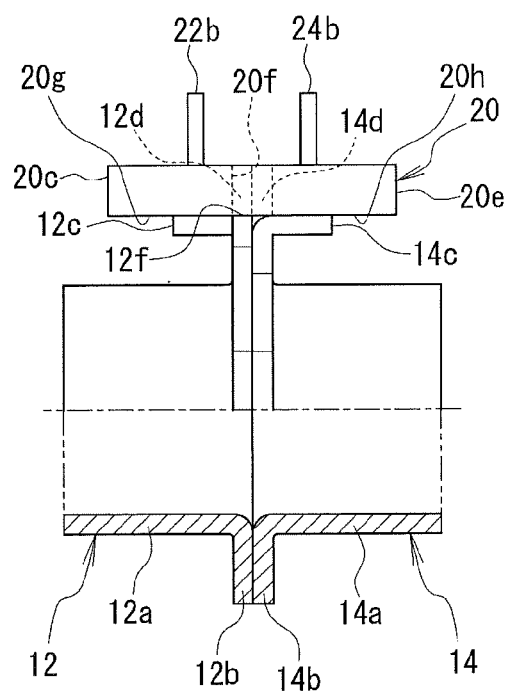

A stepping motor in accordance with a first embodiment of the present invention will be described in detail below with reference to the accompanying drawings. The first embodiment is an embodiment for describing a first invention. FIG. 1 is a sectional side view schematically showing a stepping motor in accordance with an embodiment of the present invention. FIG. 2(a) is a top plan view showing a terminal block, FIG. 2(b) is its side view and FIG. 2(c) is its front view. FIG. 3(a) is a top plan view showing inner stator cores, FIG. 3(b) is its side view, and FIG. 3(c) is its partly cross sectional front view. FIG. 4(a) is a top plan view showing a state where a terminal block is fixed to inner stator cores, FIG. 4(b) is its side view, and FIG. 4(c) is its partly cross sectional front view.

A stepping motor 1 shown in FIG. 1 includes a rotor 4, which is provided with a rotation shaft 2 and a rotor magnet (permanent magnet) 3 fixed to the rotation shaft 2, and a stator 5 which is oppositely disposed to the rotor magnet 3 through a clearance.

The rotation shaft 2 is rotatably supported by a first bearing 6 and a second bearing 7. The rotor magnet 3 is structured of a substantially cylindrical permanent magnet.

The stator 5 is provided with a two-phase structure comprised of a first stator assembly 8 and a second stator assembly 9 which is disposed so as to be superposed on the first stator assembly 8 in an axial line direction.

The first and the second stator assemblies 8 and 9 are respectively structured of inner stator cores 12 and 14, and outer stator cores 13 and 15 with which drive coils 10 and 11 are sandwiched together with the inner stator cores 12 and 14. The stepping motor in this embodiment is a bobbin-less type stepping motor in which a coil bobbin is not used and an air-core coil is used as the drive coils 10 and 11. In the following description, the drive coil is expressed as an air-core coil.

A plurality of pole teeth 12a and 14a respectively formed in the inner stator cores 12 and 14 and a plurality of pole teeth 13a and 15a respectively formed in the outer stator cores 13 and 15 are disposed so as to be alternately juxtaposed each other on inner peripheral sides of the air-core coils 10 and 11. Therefore, in this embodiment, the ring-shaped air-core coil 10 is disposed on outer peripheries of the respective pole teeth 12a and 13a of the inner stator core 12 and the outer stator core 13 in the first stator assembly 8 and, similarly, the ring-shaped air-core coil 11 is disposed on outer peripheries of the respective pole teeth 14a and 15a of the inner stator core 14 and the outer stator core 15 in the second stator assembly 9.

As shown in FIG. 1, a plurality of the pole teeth 12a and 14a are respectively formed erectly at inner circumferential edges of the inner stator cores 12 and 14 in the first and the second stator assemblies 8 and 9 with a substantially equal interval in a ring-shaped manner. Similarly, a plurality of the pole teeth 13a and 15a are respectively formed erectly at inner circumferential edges of the outer stator cores 13 and 15 with a substantially equal interval in a ring-shaped manner. In this embodiment, respective outer peripheral edges of the outer stator cores 13 and 15 are bent and erectly formed so as to cover the outer peripheries of the air-core coils 10 and 11 to function as a motor case respectively. In the following description, the portions which are bent and erectly formed from the respective outer peripheral edges of the outer stator cores 13 and 15 so as to cover the outer peripheries of the air-core coils 10 and 11 are referred to as a first motor case 16 and a second motor case 17. The first motor case 16 and the second motor case 17 are respectively formed in a cylindrical shape by drawing working.

A mounting plate 18 which is used for mounting the stepping motor 1 on an equipment is fixed to the outer stator core 13 of the first stator assembly 8. The first bearing 6 as a radial bearing for rotatably supporting the rotation shaft 2 on the output side is supported by the mounting plate 18. Further, a side plate 19 is fixed to the outer stator core 15 of the second stator assembly 9 and the second bearing 7 as a radial bearing for rotatably supporting the rotation shaft 2 on an opposite-to-output side is supported by the side plate 19. One end of the rotation shaft 2 of the rotor 4 is protruded from the outer stator core 13 of the first stator assembly 8 on an outer side (output side) to be formed as an output shaft for rotation drive.

A terminal block 20 in which a plurality of terminal pins 21 through 24 around which coil ends 10a and 11a drawn from the air-core coils 10 and 11 are wound are provided on the outer peripheral side of the stator 5 structured as described above.

In the stepping motor 1 structured as described above, when a predetermined electric current is supplied to the air-core coils 10 and 11 of the stator 5, the rotor magnet 3 is rotated by magnetic interaction between the stator 5 and the rotor magnet 3 to rotate the rotation shaft 2. An operation of the above-mentioned stepping motor 1 is the same as that of a well-known stepping motor and thus its detailed description is omitted.

As shown in FIG. 2(a), the terminal block 20 is formed of insulating resin material and formed in a roughly "H" shape in which two cutout parts 20a are formed so that they are cut in an axial direction so as to face each other toward an engaging hole 20f formed at its center. As a result, the terminal block 20 is formed with four base portions 20b, 20c, 20d and 20e to which four terminal pins 21, 22, 23 and 24 are respectively attached.

In FIG. 2(a), the coil ends 10a drawn from the air-core coil 10 of the first stator assembly 8 are wound around the left side terminal pins 21 and 22. Further, the coil ends 11a drawn from the air-core coil 11 of the second stator assembly 9 are wound around the right side terminal pins 23 and 24.

More specifically, innermost faces 20aa of the cutout parts 20a are formed so as to cut up to a substantially the same position as those of the respective terminal pins 21 through 24 in the axial direction and the four base portions 20b through 20e are formed divided by the cutout parts 20a. Further, the cutout parts 20a are used as a drawing part through which the coil ends 10a and 11a are drawn when the coil ends 10a and 11a drawn from the air-core coils 10 and 11 are wound around the respective terminal pins 21 through 24. In this embodiment, the innermost face 20aa of the cutout part 20a which is formed as the drawing part is formed so as to cut up to nearly the same position in the axial direction as the protruded positions of the coil winding parts 21b through 24b of the respective terminal pins 21 through 24. Therefore, the coil ends 10a and 11a can be wound around the respective terminal pins 21 through 24, for example, without going through the end face or the side face of the terminal block 20. Accordingly, an excessive tension is not applied to the coil ends 10a and 11a, and the coil ends 10a and 11a are not caught by the end face or the side face of the terminal block 20, the first motor case 16 or the second motor case 17 and thus their disconnection or damage can be prevented.

The terminal pins 21 through 24 are integrally provided through insert-molding when the terminal block 20 comprised of a resin member having insulation property is resin-molded. In this case, the respective terminal pins 21 through 24 include attaching parts 21a through 24a, which are mounted to be embedded in the terminal block 20, and coil winding parts 21b through 24b around which the coil ends 10a and 11a are wound.

As shown in FIGS. 2(a), 2(b) and 2(c), the attaching parts 21a through 24a of the terminal pins 21 through 24 are embedded in the terminal block 20 so as to point in a direction substantially parallel to the axial direction of the stepping motor 1. Further, the coil winding parts 21b through 24b of the terminal pins 21 through 24 are bent in a direction different from the direction of the attaching parts 21a through 24a, in this case, in a direction crossing the axial direction of the motor 1 to be protruded from the base portions 20b through 20e of the terminal block 20. In other words, the terminal pins 21 through 24 are formed in an "L"-shape. Further, the engaging hole 20f which is formed at a center of the terminal block 20 is an opening hole into which the second holding parts 12d and 14d formed in the flange parts 12b and 14b of the inner stator cores 12 and 14 are fitted as described below.

FIGS. 3(a), 3(b) and 3(c) show states where the inner stator core 12 of the first stator assembly 8 and the inner stator core 14 of the second stator assembly 9 are disposed in a back-to-back manner. Flange parts 12b and 14b extending in a ring shape toward an outer peripheral side are formed on the base end side of the pole teeth 12a and 14a of the inner stator cores 12 and 14. The flange parts 12b and 14b are provided with terminal block holding parts 30 and 31 for fixing the terminal block 20 thereto.

The terminal block holding part 30 formed in the flange part 12b of the inner stator core 12 is formed with a first holding part (first bottom face support part) 12c, which is formed in a flat plate shape and is bent at a substantially right angle from the flange part 12b to be extended in the axial direction for supporting the bottom face 20g of the terminal block 20, and a second holding part (positioning part) 12d which is formed in a flat plate shape and is extended from the flange part 12b in a direction crossing the axial direction to be fitted into the engaging hole 20f of the terminal block 20 for positioning the terminal block 20 in the axial direction and the circumferential direction together with the inner stator core 14.

Similarly, the terminal block holding part 31 formed in the flange part 14b of the inner stator core 14 is formed with a first holding part (first bottom face support part) 14c, which is formed in a flat plate shape and is bent at a substantially right angle from the flange part 14b to be extended in the axial direction for supporting the bottom face 20h of the terminal block 20, and a second holding part (positioning part) 14d which is formed in a flat plate shape and is extended from the flange part 14b in a direction crossing the axial direction to be fitted into the engaging hole 20f of the terminal block 20 for positioning the terminal block 20 in the axial direction and the circumferential direction together with the second holding part 12d of the inner stator core 12.

The terminal block holding parts 30 and 31 are respectively formed at the same end portions of the flange parts 12b and 14b of the inner stator cores 12 and 14. The respective second holding parts 12d and 14d are formed on the center sides in the terminal block holding parts 30 and 31. Further, the first holding parts 12c and 14c are formed at positions different from the second holding parts 12d and 14d, in other words, at diagonal positions with the second holding parts 12d and 14d as the center. The first holding parts 12c and 14c are formed in a parallel manner in a state where cutout parts 12e and 14e are formed between the second holding parts 12d and 14d and the first holding parts 12c and 14c. In this embodiment, the first holding parts 12c and 14c are formed on only one side adjacent to the second holding parts 12d and 14d.

Similarly to the second holding parts 12d and 14d, stepped parts 12f and 14f extended to the direction crossing the axial direction from the flange parts 12b and 14b are formed on the other sides adjacent to the second holding parts 12d and 14d (opposite sides to the first holding parts 12c and 14c). Tip end positions of the stepped parts 12f and 14f are set to be substantially the same as supporting positions of the first holding parts 12c and 14c bent from the flange parts 12b and 14b to be structured as a second bottom face support part (auxiliary bottom face support part) for supporting the bottom face of the terminal block 20. In this case, as shown in FIG. 3(b), the first holding part 12c which is formed in the flange part 12b of the inner stator core 12 is disposed on the left side of the second holding part 12d with respect to the axial direction, and the stepped part 12f of the second holding part 12d is disposed on the right side with respect to the first holding part 12c. The first holding part 14c, the second holding part 14d and the stepped part 14f of the inner stator core 14 which is disposed on the rear face side of the inner stator core 12 shown in FIG. 3(b) are similarly arranged.

In other words, as shown in FIGS. 3(a) through 3(c), the inner stator core 12 and the inner stator core 14 are disposed in a back-to-back manner so that the second holding part 12d of the inner stator core 12 and the second holding part 14d of the inner stator core 14 are superposed on each other. The second holding parts 12d and 14d in the superposed state are fitted into the engaging hole 20f of the terminal block 20 and thus the terminal block 20 is held by the terminal block holding parts 30 and 31 and positioned in the axial direction and in the circumferential direction. In this embodiment, the first holding parts 12c and 14c and the stepped parts 12f and 14f are disposed in the state where the respective supporting portions are not overlapped with each other in the axial direction so that a wider range of the bottom face can be supported. Further, the circular arc-shaped cutout parts 12e and 14e are formed between the first holding parts 12c and 14c and the second holding parts 12d and 14d. Since the cutout parts 12e and 14e are provided, even when the first holding parts 12c and 14c are structured by using the stator cores themselves, bending work is easily performed and thus the first holding parts 12c and 14c can be easily structured. Further, the circular arc-shaped cutout parts 12g and 14g are formed between the stepped parts 12f and 14f and the second holding parts 12d and 14d. Since the cutout parts 12g and 14g are provided, working for forming the stepped parts 12f and 14f is easily performed.

FIGS. 4(a) through 4(c) show states where the terminal block 20 is fixed to the terminal block holding parts 30 and 31. As shown in FIGS. 4(a) through 4(c), the second holding parts 12d and 14d in the superposed state are fitted to the engaging hole 20f of the terminal block 20 so that the terminal block 20 is fixed to the terminal block holding parts 30 and 31. In this case, the bottom face 20g of the base portion 20b of the terminal block 20 is supported by the first holding part 12c formed in the flat plate shape which is provided in the terminal block holding part 30 of the inner stator core 12, and the bottom face 20h of the base portion 20e of the terminal block 20 is supported by the first holding part 14c formed in the flat plate shape which is provided in the terminal block holding part 31 of the inner stator core 14. In addition, the bottom face 20g near the base portion 20c of the terminal block 20 is supported by the stepped part 12f formed adjacent to the second holding part 12d in the flange part 12b, and the bottom face 20h near the base portion 20d of the terminal block 20 is supported by the stepped part 14f formed adjacent to the second holding part 14d in the flange part 14b.

Further, as shown in FIGS. 4(a) and 4(c), the first holding parts 12c and 14c are formed so that length dimensions of the first holding parts 12c and 14c are set to be roughly a half the length dimension of the base portions 20b and 20e in the axial direction. Specifically, a tip end in the axial direction of the first holding part 12c formed in the inner stator core 12 is extended up to an outer side position in the axial direction with respect to the position of the coil winding part 21b of the terminal pin 21. Further, the first holding part 12c is formed so as to support an outer side position of the coil winding part 21b in a circumferential direction (up-and-down direction in FIG. 4(a) and right-and-left direction in FIG. 4(b)). In addition, the first holding part 14c formed in the inner stator core 14 is extended in the axial direction, i.e., in the opposite direction to the first holding part 12c, up to an outer side position with respect to the coil winding part 24b of the terminal pin 24. Further, the first holding part 14c is formed so as to support an outer side position of the coil winding part 24b in the circumferential direction. In addition, width dimensions of the first holding parts 12c and 14c (up-and-down direction in FIG. 4(a) and right-and-left direction in FIG. 4(b)) are set to be roughly a half width dimension of the base portions 20b and 20e. Therefore, when the terminal block 20 is pressed to the inner stator cores 12 and 14 at positions of the base portions 20b and 20e, the bottom face of the terminal block 20 is supported at outer positions of the coil winding parts 21b and 24b by the two first holding parts 12c and 14c of the inner stator cores 12 and 14 which are formed at symmetrical positions and respectively directed in opposite directions so as to interpose the engaging hole 20f of the terminal block 20. As a result, inclination of the terminal block can be prevented.

Further, the engaging hole 20f of the terminal block is formed in a size of two phases, in other words, formed in substantially the same size as the thickness of the second holding parts 12d and 14d which are superposed on each other. The bottom faces 20g and 20h of the terminal block 20 are positioned in the radial direction by the first holding parts 12c and 14c in the flat plate shape and by the stepped parts 12f and 14f and thus the second holding parts 12d and 14d do not protrude from the engaging hole 20f toward the outer side in the radial direction. In other words, the stepped parts 12f and 14f also function as a positioning part in the radial direction toward the inner side of the terminal block 20.

According to the motor 1 in this embodiment, the flange parts 12b and 14b of the inner stator core 12 of the first stator assembly 8 and the inner stator core 14 of the second stator assembly 9 are superposed on each other and, in this state, the second holding parts 12d and 14d are fitted into the engaging hole 20f formed at the center portion of the terminal block 20 and the terminal block 20 is held by the second holding parts 12d and 14d. Further, the bottom face 20g of the base portion 20b of the terminal block 20 is supported by the first holding part 12c in a flat plate shape which is formed to be bent and extended to one side in the axial direction from the flange part 12b of the inner stator core 12, and a portion near the bottom face 20g of the base portion 20c of the terminal block 20 is supported by the stepped part 12f formed in the flange part 12b across the second holding part 12d. In addition, the bottom face 20h of the base portion 20e of the terminal block 20 is supported by the first holding part 14c in a flat plate shape which is formed to be bent and extended to the other side in the axial direction from the flange part 14b of the inner stator core 1, and a portion near the bottom face 20h of the base portion 20d of the terminal block 20 is supported by the stepped part 14f formed in the flange part 14b across the second holding part 14d. In other words, the center portion of the terminal block 20 is supported by the second holding parts 12d and 14d, and the four base portions 20b through 20e are supported by either of the first holding parts 12c and 14c and the stepped parts 12f and 14f. Therefore, the terminal block 10 which is supported as described above can be fixed in a stable state and movement in the axial direction and inclination can be prevented.

Further, when a power supply board such as a flexible circuit board is to be mounted on the terminal block 20 to connect to the coil ends 10a and 11a wound around the terminal pins 21 through 24, a force applied to the terminal block 20 is received by the first holding parts 12c and 14c, the second holding parts 12d and 14d, and the stepped parts 12f and 14f. Therefore, working and the like can be easily performed in which a power supply board such as a flexible circuit board is mounted on the terminal block 20 to connect circuit patterns of the flexible circuit board to the terminal pins 21 through 24.

Further, the first holding parts 12c and 14c and the second holding parts 12d and 14d which are formed in the inner stator cores 12 and 14 are formed on the same side of the flange parts 12b and 14b. The second holding parts 12d and 14d are formed at a substantially center position of the terminal block holding parts 30 and 31, and the first holding parts 12c and 14c are formed at positions different from the second holding parts 12d and 14d. In other words, the first holding parts 12c and 14c are formed on only one side adjacent to the second holding parts 12d and 14d in a state where the cutout parts 12e and 14e are formed between the second holding parts 12d and 14d and the first holding parts 12c and 14c. Therefore, the coil end 10a drawn from the air-core coil 10 and the first holding part 12c do not interfere with each other, and the coil end 11a drawn from the air-core coil 11 and the first holding part 14c do not interfere with each other and thus disconnection and damage of the coil ends 10a and 11a can be prevented. In addition, the cutout parts 20a of the terminal block 20 are formed at the same position in the circumferential direction as the second holding parts 12d and 14d and whose innermost faces 20aa are located on the engaging hole 20f side in the axial direction with respect to the tip ends of the first holding parts 12c and 14c, in other words, the innermost faces 20aa are formed in the vicinity of the coil winding parts 21b through 24b. Therefore, the coil ends 10a and 11a are drawn from the cutout parts 20a of the terminal block 20 to be wound around the respective terminal pins 21 through 24 and thus they are not affected by the first holding parts 12c and 14c and winding working of the coil ends 10a and 11a are easily performed.

Further, the first holding parts 12c and 14c are bent and extended in the same direction as the bending direction of the pole teeth 12a and 14a which are formed from the inner circumferential edges of the flange parts 12b and 14b. Therefore, forming work for the first holding parts 12c and 14c can be performed simultaneously with bending work of the pole teeth 12a and 14a and thus workability of the inner stator cores 12 and 14 is improved.

FIG. 5(a) through 5(c) and FIG. 6(a) through 6(c) show a first modified example of the stator cores 12 and 14 which are provided in the above-mentioned stepping motor 1. In this example, the same notational symbols are used for the same structure as the above-mentioned embodiment and their description is omitted and different structure will be described below.

Figure 5A:
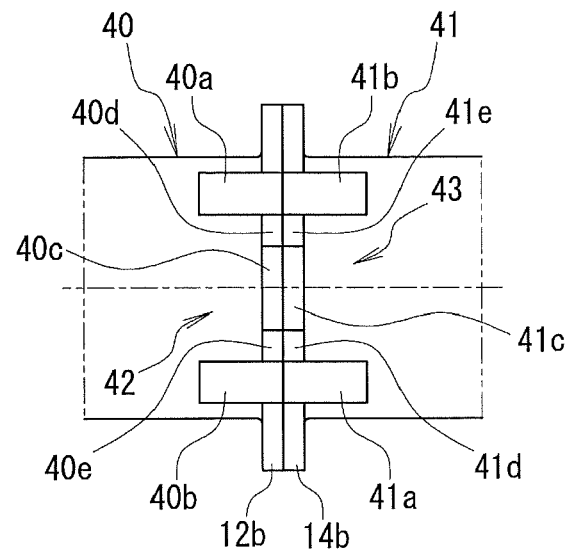
FIG. 5(a) is a top plan view showing a first modified example of the inner stator cores shown in FIGS. 3(a) through 3(c)
Figure 5B:
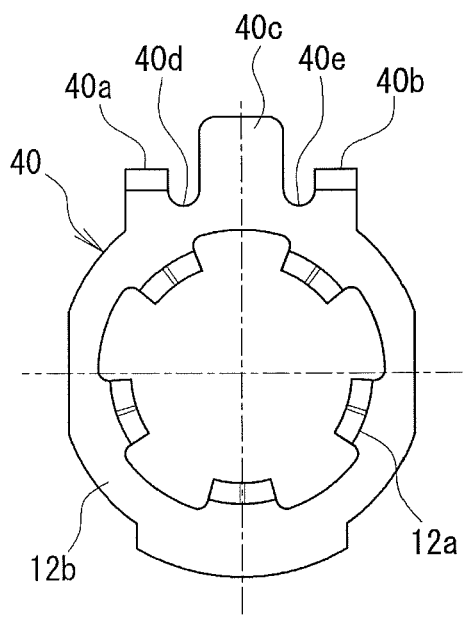
FIG. 5(b) is its side view and FIG. 5(c) is its partly cross sectional front view.
Figure 5C:
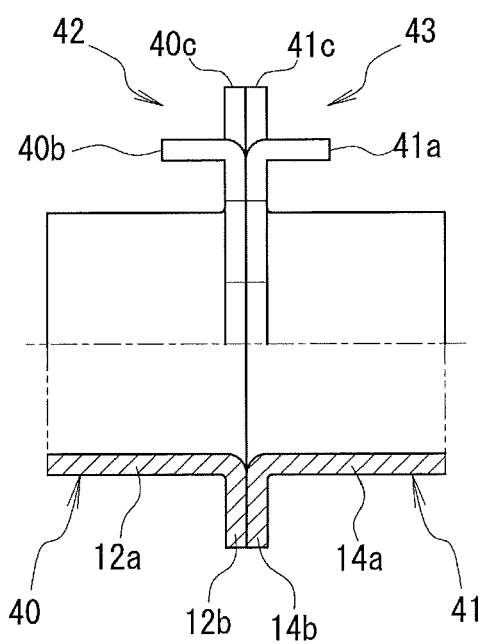

FIG. 5(a) is a top plan view showing inner stator cores 40 and 41, which are superposed on each other in an axial direction, in accordance with a first modified example, FIG. 5(b) is its side view and FIG. 5(c) is its partly cross sectional front view. A terminal block holding part 42 formed in a flange part 12b of an inner stator core 40 is formed with two first holding parts 40a and 40b, which are bent and extended at a substantially right angle in an axial direction from a flange part 12b to support a bottom face 20g of a terminal block 20, and a second holding part 40c which is extended in a direction crossing the axial direction from the flange part 12b to be fitted into an engaging hole 20f of a terminal block 20.

Similarly, a terminal block holding part 43 of an inner stator core 41 is formed with two first holding parts 41a and 41b, which are bent and extended at a substantially right angle in an axial direction from a flange part 14b to support a bottom face 20h of the terminal block 20, and a second holding part 41c which is extended in a direction crossing the axial direction from the flange part 14b to be fitted into the engaging hole 20f of the terminal block 20.

The terminal block holding parts 42 and 43 are respectively formed on the same side of the flange parts 12b and 14b of the inner stator cores 40 and 41. The respective second holding parts 40c and 41c are formed at substantially center positions of the terminal block holding parts 42 and 43 and the first holding parts 40a, 40b, 41a and 41b are formed at positions different from the second holding parts 40c and 41c.

In this case, as shown by the side view in FIG. 5(b), the first holding parts 40a and 40b formed in the flange parts 12b of the inner stator core 40 are disposed on both the right and left sides of the second holding part 40c. The first holding parts 41a and 41b and the second holding part 41c of the inner stator core 41, which is disposed on the rear face side of the inner stator core 40 shown in FIG. 5(b), are similarly arranged. Further, circular arc-shaped cutout parts 40d and 40e are formed between the first holding parts 40a and 40b and the second holding part 40c of the inner stator core 40, and thus bending work of the first holding parts 40a and 40b is easily performed by providing the cutout parts 40d and 40e. Similarly, circular arc-shaped cutout parts 41d and 41e are formed between the first holding parts 41a and 41b and the second holding part 41c of the inner stator core 41, and bending work of the first holding parts 41a and 41b is easily performed by providing the cutout parts 41d and 41e.

As shown in FIGS. 5(a) through 5(c), the inner stator core 40 and the inner stator core 41 are disposed in a back-to-back manner so that the second holding part 40c of the inner stator core 40 and the second holding part 41c of the inner stator core 41 are just overlapped with each other. The second holding parts 40c and 41c in the superposed state are fitted into the engaging hole 20f of the terminal block 20 to fix the terminal block 20 to the terminal block holding parts 42 and 43.

Figure 6A:
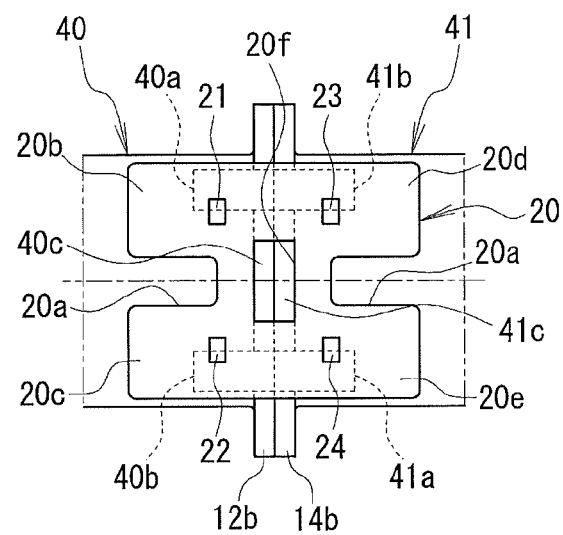
FIG. 6(a) is a top plan view showing a state where a terminal block is fixed to flange parts of the inner stator cores in the first modified example.
Figure 6B:
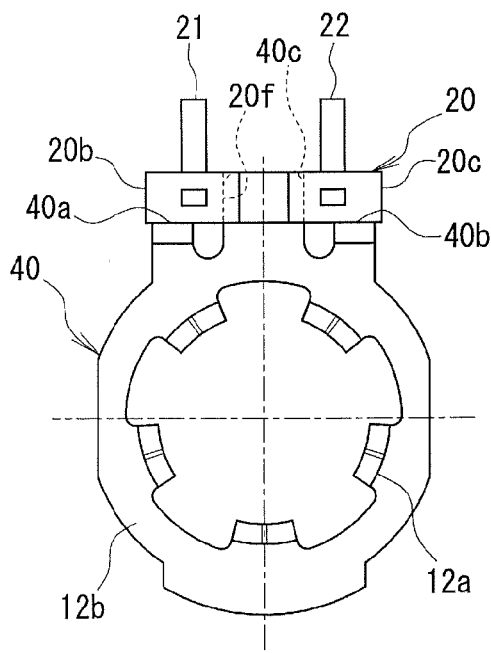
FIG. 6(b) is its side view.
Figure 6C:
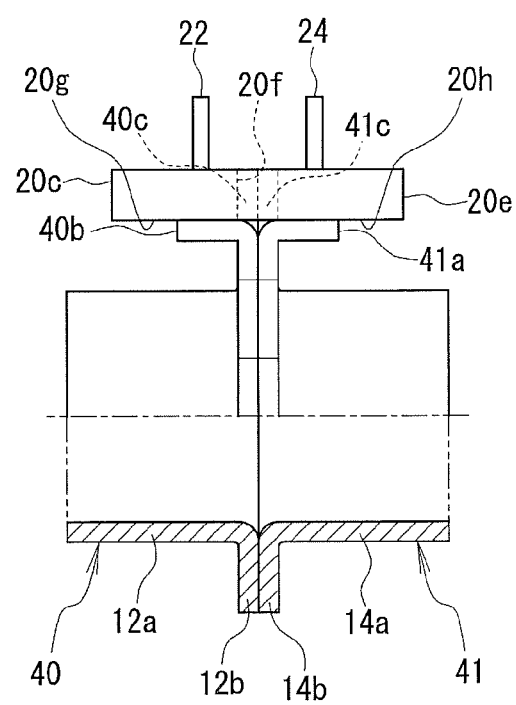
FIG. 6(c) is its partly cross sectional front view.

FIGS. 6(a) through 6(c) show the state where the terminal block 20 is fixed to the terminal block holding parts 42 and 43. As shown in FIGS. 6(a) through 6(c), the second holding parts 40c and 41c in the superposed state are fitted into the engaging hole 20f of the terminal block 20 and, as a result, the terminal block 20 is fixed to the terminal block holding parts 42 and 43. In addition, the bottom face 20g of the base portions 20b and 20c of the terminal block 20 is supported by the first holding parts 40a and 40b provided in the terminal block holding part 42 of the inner stator core 40, and the bottom face 20h of the base portions 20d and 20e of the terminal block 20 is supported by the first holding parts 41b and 41a provided in the terminal block holding part 43 of the inner stator core 41. In this case, the positional relationship, the size and the like between the first holding parts 40a and 40b provided in the inner stator core 40 and the terminal block 20, and the positional relationship, the size and the like between the first holding parts 41b and 41a provided in the inner stator core 41 and the terminal block 20 may be set in the same condition as the embodiment which is described with reference to FIG. 1 through FIG. 4(c). However, since the first holding parts are provided on both sides, i.e., up-and-down sides and right-and-left sides of the second holding parts 40c and 41c, the length and the width of the first holding part may be reduced in comparison with the above-mentioned embodiment.

According to the example structured as described above, the bottom faces 20g and 20h of the terminal block 20 are supported more firmly by the four supporting faces, i.e., the first holding parts 40a, 40b, 41a and 41b and thus careless inclination of the terminal block 20 is prevented. Therefore, connecting work is easily performed in which a flexible circuit board is placed on the terminal block 20 and circuit patterns of the flexible circuit board are connected to the terminal pins 21 through 24.

FIGS. 7(a) through 7(c) and FIGS. 8(a) through 8(c) are a second modified example of the stator cores 12 and 14 which are provided in the stepping motor 1. In this example, the same notational symbols are used for the same structure as the above-mentioned embodiment and their description is omitted and different structure will be described below. In this second modified example, a terminal block 54 is not formed with the above-mentioned engaging hole 20f.

Figure 7A:
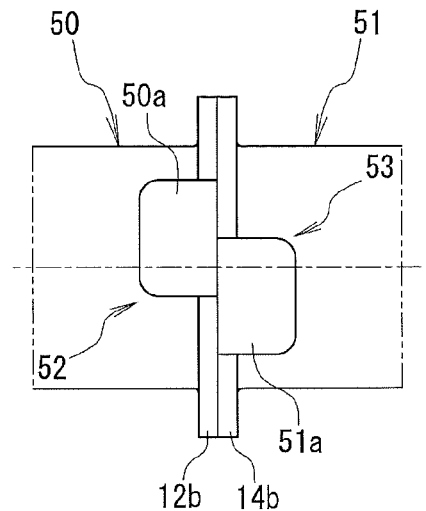
FIG. 7(a) is a top plan view showing a second modified example of the inner stator cores shown in FIGS. 3(a) through 3(c)
Figure 7B:
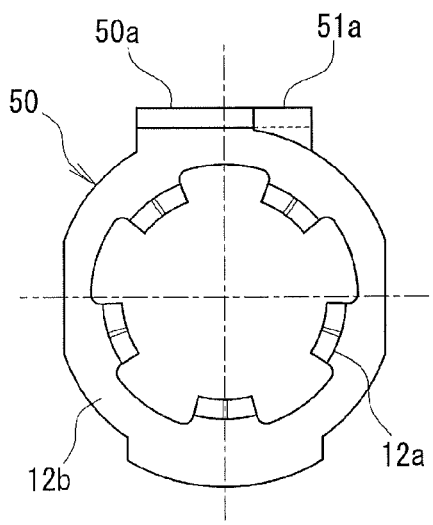
FIG. 7(b) is its side view.
Figure 7C:
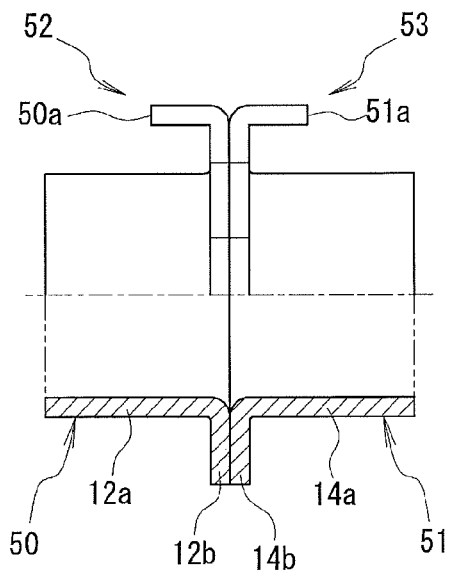
FIG. 7(c) is its partly cross sectional front view.

FIGS. 7(a) through 7(c) show a state where an inner stator core 50 and an inner stator core 51 in accordance with a second modified example are superposed on each other in an axial direction. FIG. 7(a) is its top plan view, FIG. 7(b) is its side view and FIG. 7(c) is its front view respectively. A terminal block holding part 52 formed in a flange part 12b of the inner stator core 50 is formed with a first holding part 50a which is bent and extended from the flange part 12b at a substantially right angle in the axial direction for supporting a bottom face 20g of the terminal block 54. Similarly, a terminal block holding part 53 of the inner stator core 51 is formed with a first holding part 51a which is bent and extended from the flange part 14b at a substantially right angle in the axial direction for supporting a bottom face 20h of the terminal block 54.

The terminal block holding parts 52 and 53 are respectively formed on the same sides of the flange parts 12b and 14b of the inner stator cores 50 and 51, and the respective first holding parts 50a and 51a are formed at a little shifted position in opposite directions from the axial line X.

As shown in FIGS. 7(a) through 7(c), the inner stator core 50 and the inner stator core 51 are disposed in a back-to-back manner so that the first holding part 50a of the inner stator core 50 and the first holding part 51a of the inner stator core 51 are overlapped with each other in a shifted state. In this case, when widths of the first holding parts 50a and 51a are increased, the bottom faces 20g and 20h of the terminal block 20 can be supported stably.

FIGS. 8(a) through 8(c) show a state where the terminal block 54 is fixed to the terminal block holding parts 52 and 53 with an adhesive. The bottom face 20g of the base portion 20b of the terminal block 54 and the bottom face 20g near the cutout part 20a are supported by the first holding part 50a provided in the terminal block holding part 52 of the inner stator core 50, and the bottom face 20h of the base portion 20e of the terminal block 54 and the bottom face 20h near the cutout part 20a are supported by the first holding part 51a provided in the terminal block holding part 53 of the inner stator core 51. Further, similarly to the above-mentioned embodiment, it is preferable that tip ends in the axial direction of the first holding parts 50a and 51a formed in the inner stator cores 50 and 51 are extended up to outer side positions in the axial direction with respect to the positions of the coil winding parts 21b and 24b of the terminal pins 21 and 24 and, further, that the first holding parts 50a and 51a are formed so as to support outer side positions of the coil winding parts 21b and 24b in a circumferential direction (up-and-down direction in FIG. 8(a) and right-and-left direction in FIG. 8(b)). According to the structure as described above, the terminal block 20 is supported stably. In this embodiment, the first holding parts 50a and 51a are partly located in the cutout parts 20a. In this case, when coil ends (not shown) are wound around the coil winding parts 21b through 24b of the respective terminal pins by passing through side faces of the cutout parts 20a (upper and lower side faces in FIG. 8(a)), disconnection and damage of the coil end can be prevented at the time of winding.

According to this embodiment, the bottom faces 20g and 20h of the terminal block 54 are supported by the first holding parts 50a and 51a and thus inclination of the terminal block 54 is prevented. Therefore, connecting work is easily performed in which a flexible circuit board is placed on the terminal block 54 and circuit patterns of the flexible circuit board are connected to the terminal pins 21 through 24.

The first invention has been described in detail by using the embodiments, but the present invention is not limited to the embodiments described above and many modifications can be made without departing from the present invention. For example, in the embodiment described above, the first holding part is formed in the inner stator core but may be formed in the outer stator core.

Second Embodiment

Figure 9:
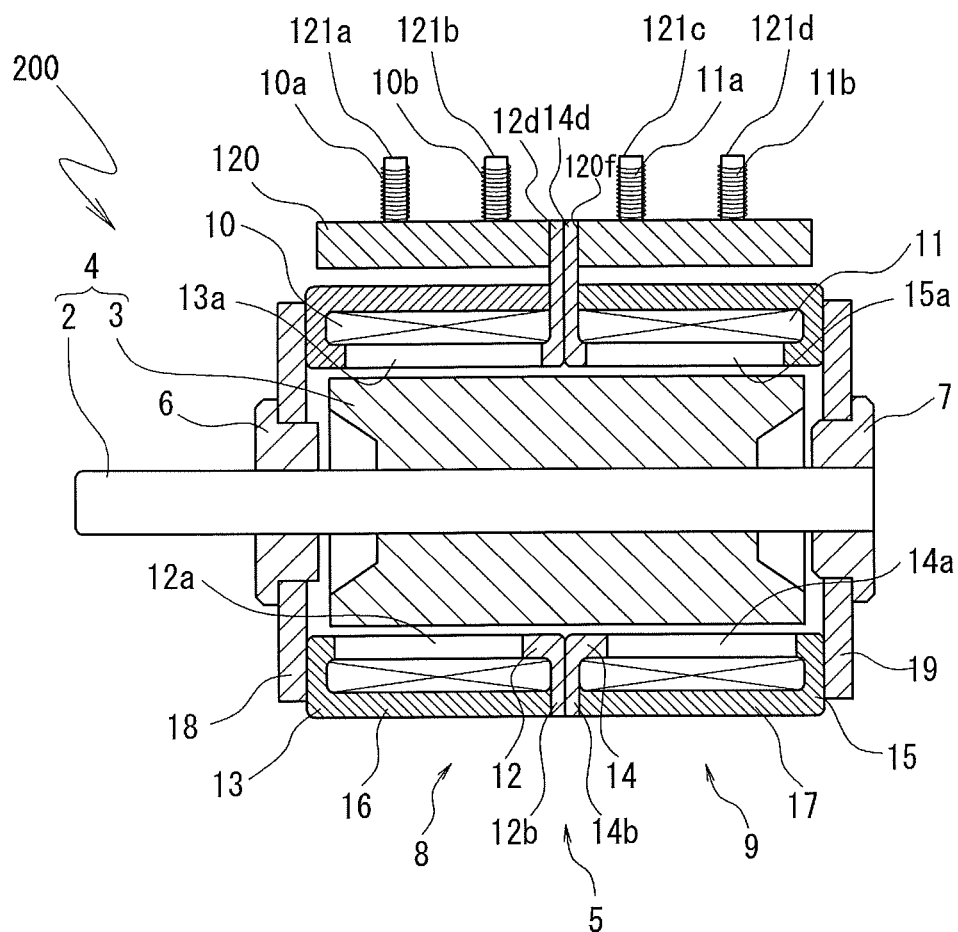
FIG. 9 is a cross sectional side view showing a stepping motor in accordance with a second embodiment of the present invention.
Figure 10:
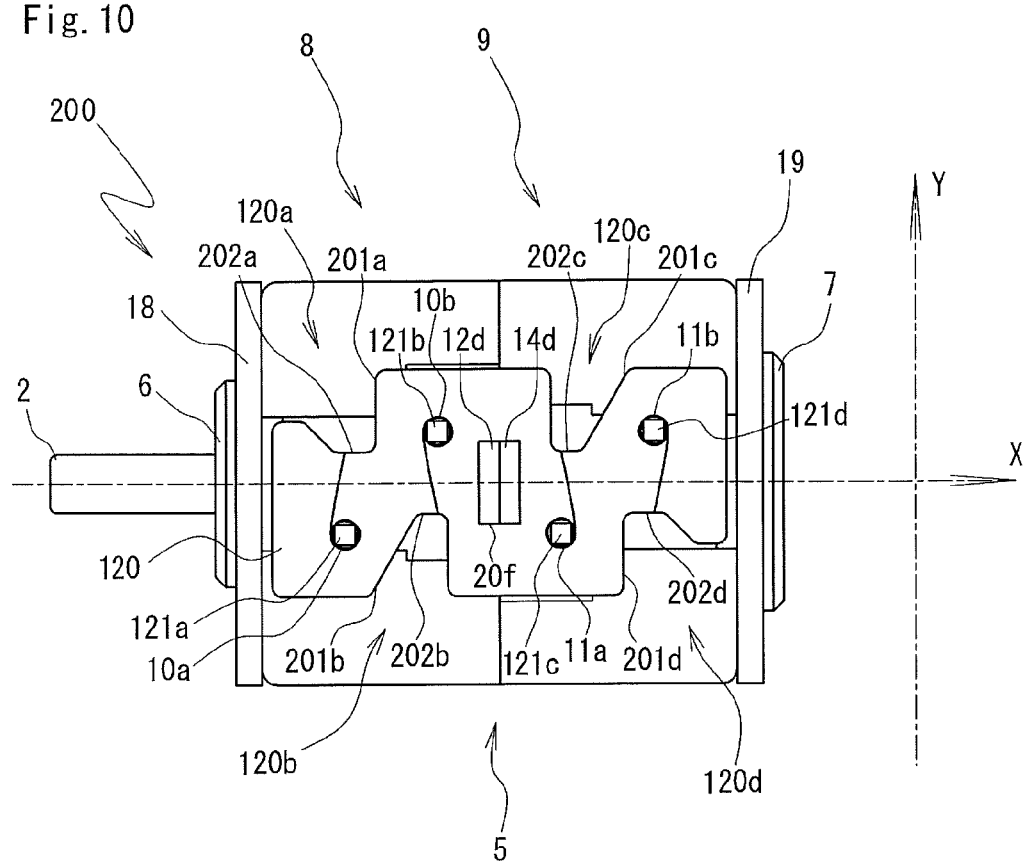
FIG. 10 is a top plan view showing the stepping motor shown in FIG. 9 (in a state where a flexible circuit board is not connected).
Figure 11:
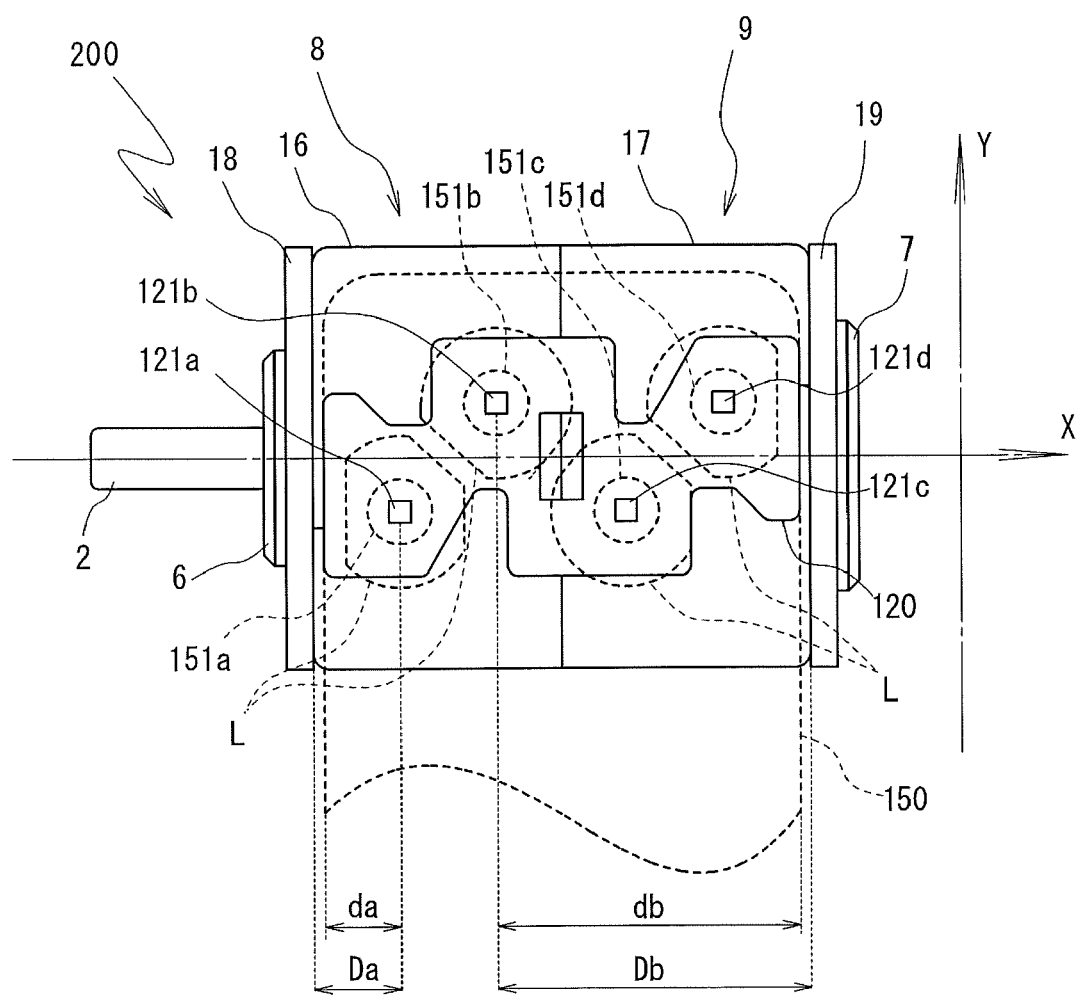
FIG. 11 is a top plan view showing the stepping motor shown in FIG. 9 (in a state where the flexible circuit board is connected).

A stepping motor in accordance with a second embodiment will be described in detail below with reference to the accompanying drawings. The second embodiment is an embodiment for describing a second invention. FIG. 9 is a cross sectional side view schematically showing a stepping motor 200 in accordance with a second embodiment of the present invention. FIG. 10 is a top plan view showing the stepping motor 200, and FIG. 11 is a top plan view showing the stepping motor 200 for explaining a state where a flexible circuit board is mounted as described below. A motor structure in the stepping motor 200 is the same as the above-mentioned first embodiment and thus the same notational symbols are used for the same structure as the above-mentioned embodiment and their description is omitted and different structure will be described below.

The stepping motor 200 shown in FIG. 9 is also provided with inner stator cores 12 and 14. Flange parts 12b and 14b which are extended on outer peripheral sides are formed on the base end sides of the pole teeth 12a and 14a. The flange parts 12b and 14b are provided with holding parts 12d and 14d for fixing a terminal block, i.e., provided with the above-mentioned second holding parts (positioning part in the axial and circumferential directions). However, the stepping motor 200 shown in FIG. 9 is not provided with the above-mentioned first holding parts (first bottom face support part), which are provided in the inner stator cores 12 and 14 of the first embodiment.

A terminal block 120 where a plurality of terminal pins 121a through 121d to which coil ends 10a, 10b and 11a, 11b drawn from drive coils 10 and 11 are wound is mounted on an outer peripheral side of a stator 5. In the second embodiment, a structure of the terminal block 120 is different from the above-mentioned first embodiment as described below.

In the stepping motor 200 in accordance with the second embodiment, as shown in FIG. 10, four cut-out parts 120a through 120d are formed on a periphery of the terminal block 120. The terminal block 120 is provided with four terminal pins 121a through 121d and is formed with an engaging hole 120f at its center. Terminal block holding parts 12d and 14d of the inner stator cores 12 and 14 are fitted into the engaging hole 120f and, as a result, the terminal block 120 is fixed to the stator 5.

The terminal pins 121a through 121d are terminals for supplying an electric power to the drive coils 10 and 11. The terminal pins 121a through 121d are integrally provided in the terminal block 120 by insert-molding when the terminal block 120 made of a resin member having insulation property is resin-molded.

The coil ends 10a and 10b drawn from the drive coil 10 are wound around the terminal pins 121a and 121b of the first stator assembly 8. Further, the coil ends 11a and 11b drawn from the drive coil 11 are wound around the terminal pins 121c and 121d of the second stator assembly 9. In this embodiment, the terminal pins 121a and 121c to which first coil ends 10a and 11a of the drive coils 10 and 11 are wound (left side terminal pins in the first stator assembly 8 and the second stator assembly 9 in FIG. 10) are referred to as a first terminal pin, and the terminal pins 121b and 121d to which second coil ends 10b and 11b are wound (right side terminal pins in the first stator assembly 8 and the second stator assembly 9 in FIG. 10) are referred to as a second terminal pin.

In this embodiment, as shown in FIG. 10, the terminal pins 121a through 121d are disposed along an axial direction of a rotation shaft 2 (X-axis direction). Especially, the terminal pins 121a and 121d which are located on outer sides in the respective stator assemblies 8 and 9 are disposed on outer sides with respect to center positions in the axial direction of the respective stator assemblies 8 and 9. Specifically, the terminal pins 121a and 121d in the respective stator assemblies 8 and 9 are located at nearer positions to flange parts formed on the base end sides of the pole teeth 13a and 15a of the outer stator cores 13 and 15 than flange parts 12b and 14b of the inner stator cores 12 and 14. Further, the other terminal pins 121b and 121c are located at nearer positions to the flange parts 12b and 14b of the inner stator cores 12 and 14 than the flange parts of the outer stator cores 13 and 15. In other words, the terminal pins 121a through 121d are not disposed in a superposed manner in a Y-axis direction. Therefore, in comparison with a case that the terminal pins are arranged along a direction (Y-axis) perpendicular to the axial line of the rotation shaft 2, according to this embodiment, a large arrangement space can be secured and thus distances between the respective terminal pins 121a through 121d can be increased.

In addition, the terminal pins 121a through 121d are arranged to be shifted by substantially the same amount at upper and lower positions (upper and lower directions in FIG. 10) with the X-axis, which is the axial line of the rotation shaft 2, as the center, in other words, the terminal pins 121a and 121c are disposed away from the terminal pins 121b and 121d in the up-and-down direction in FIG. 10. According to the structure as described above, the terminal pins 121a through 121d are disposed at diagonal positions of a quadrangle and thus, in comparison with a case where the terminal pins 121a through 121d are disposed along a straight line, distances between the terminal pins 121a through 121d can be increased.

The coil ends 10a, 11b, 11a and 11b are wound around the respective terminal pins 121a through 121d through the above-mentioned cut-out parts 120a through 120d. In this embodiment, the cut-out parts 120a and 120c are referred to as first cut-out parts and the cut-out parts 120b and 120d are referred to as second cut-out parts.

As shown in FIG. 10, a first coil end 10a of the drive coil 10 is wound around the terminal pin 121a after a wire of the drive coil 10 has been engaged with the cut-out part 120a. Further, a second coil end 10b of the drive coil 10 is wound around the terminal pin 21b after a wire of the drive coil 10 has been engaged with the cut-out part 120b. Similarly, the coil end 11a of the drive coil 11 is engaged with the cut-out part 120c and the other coil end 11b is engaged with the cut-out part 120d and then are respectively wound around the terminal pins 121c and 121d.

In other words, the coil ends 10a, 10b, 11a and 11b which are wound around the terminal pins 121a through 121d are drawn through the cut-out parts 120a through 120d formed at neighboring positions of the respective terminal pins 121a through 121d (cut-out parts formed in the Y-axis direction), i.e., the coil ends 10a and 10b are drawn in circumferentially opposite directions (upward and downward in the Y-axis direction in FIG. 10) and the coil ends 11a and 11b are drawn in circumferentially opposite directions.

As described above, the cut-out parts 120a through 120d are formed at the respective neighboring positions of the terminal pins 121a through 121d which are stood in the terminal block. Therefore, after wires of the drive coils 10 and 11 are engaged with the cut-out parts 120a through 120d, the coil ends 10a, 10b, 11a and 11b can be wound around the terminal pins 121a through 121d. In other words, the cut-out parts 120a through 120d are respectively used for the corresponding terminal pins 121a through 121d one by one, winding work of the coil ends 10a, 10b, 11a and 11b to the terminal pins 121a through 121 becomes easy. In addition, the coil ends 10a, 10b, 11a and 11b are drawn to be wound from the cut-out parts 120a through 120d, which are formed at the neighboring positions in the Y-axis direction of the respective terminal pins 121a through 121d. Therefore, disconnection and a short circuit due to contact of the coil ends 10a, 10b, 11a and 11b with each other can be prevented and the coil ends 10a, 10b, 11a and 11b can be firmly wound around the terminal pins 121a through 121d.

In addition, as shown in FIG. 10, the cut-out parts 120a through 120d is formed in a tapered shape (tip end parts 202a through 202d having a tapered shape) becoming narrower from a peripheral edge portion of the terminal block 120 (entry portions 201a through 201d) toward the respective corresponding terminal pins 121a through 121d.

In this manner, since the entry portions 201a through 201d of the cut-out parts 120a through 120d are largely opened, wires of the drive coils 10 and 11 can be easily engaged with the cut-out parts 120a through 120d.

Further, the cut-out parts 120a through 120d are formed to be a tapered shape becoming narrower toward the tip end parts 202a through 202d. Therefore, winding work of the coil ends 10a, 10b, 11a and 11b around the terminal pins 121a through 121d becomes easy by engaging the wires of the drive coils 10 and 11 with the cut-out parts 120a through 120d. Further, the coil ends 10a, 10b, 11a and 11b can be firmly wound around the terminal pins 121a through 121d.

In addition, as shown in FIG. 11, a flexible circuit board (power feeding circuit board) 150 on which a circuit for controlling drive of the stepping motor 200 is formed is connected to the terminal pins 121a through 121d (flexible circuit board 150 is shown by the dotted line in FIG. 11). The flexible circuit board 150 is formed with pin connection holes 151a through 151d so as to have a positional relationship corresponding to the respective terminal pins 121a through 121d. Lands L for electrically connecting the terminal pins 121a through 121d with the flexible circuit board 150 are formed around the pin connection holes 151a through 151d. In other words, the terminal pins 121a through 121d are inserted into the pin connection holes 151a through 151d and soldered and, as a result, the flexible circuit board 150 is connected to the terminal pins 121a through 121d. In this embodiment, the pin connection holes 151a and 151c into which the first terminal pins 121a and 121c are inserted are referred to as a first pin connection hole, and the pin connection holes 151*b* and 151*d* into which the second terminal pins 121*b* and 121*d* are inserted are referred to as a second pin connection hole.

In this embodiment, the terminal pins 121*a* through 121*d* are provided along the axial direction of the rotation shaft 2 (X-axis) and, as described above, the terminal pins 121*a* through 121*d* are alternately located at up-and-down positions (upper and lower directions in FIG. 2) along the X-axis direction with the X-axis as a center. Therefore, distances between the respective terminal pins 121*a* through 121*d* can be increased. Further, the lands "L" having a required size for soldering can be formed on the flexible circuit board 150. In addition, when the coil ends 10*a*, 10*b*, 11*a* and 11*b* are to be wound around the terminal pins 121*a* through 121*d* with an automatic coil winding machine, a malfunction in which its nozzle cannot pass through between the terminal pins can be prevented.

In addition, as shown in FIG. 11, the distance "Da" between the first terminal pin 121*a* (and 121*c*) and the end face on the output side of the stator 5 is designed to be larger than the distance "da" between the first pin connection hole 151*a* (and 151*c*) and the end face on the output side of the flexible circuit board 150. Further, the distance "Db" between the second terminal pin 121*b* (and 121*d*) and the end face on the opposite-to-output side of the stator 5 is designed to be larger than the distance "db" between the second pin connection hole 151*b* (and 151*d*) and the end face on the opposite-to-output side of the flexible circuit board 150.

Since the first terminal pins 121*a* and 121*c* and the second terminal pins 121*b* and 121*d* are disposed in the above-mentioned positional relationship to the stator 5, the flexible circuit board 150 does not protrude in the axial direction of the rotation shaft 2 of the stator 5. Therefore, mounting space for the stepping motor 200 is prevented from becoming larger due to the flexible circuit board 150 and thus the size of a device on which the stepping motor 200 is mounted can be reduced. It is preferable that the flexible circuit board 150 is not protruded upward in the Y-axis direction in FIG. 11 (not protruded from the upper portion of the stator 5). In this case, the mounting space of the stepping motor 200 can be further reduced.

Further, the terminal pins 121*a* through 121*d* are alternately provided at up-and-down positions toward the X-axis direction (upper and lower directions in FIG. 10). Therefore, a width due to the terminal pins 121*a* through 121*d* in the Y-axis direction can be reduced. Accordingly, when the longitudinal direction of the flexible circuit board 150 is the X-axis direction in FIG. 11, the board may be disposed so as not to protrude in the Y-axis direction.

Figure 12:
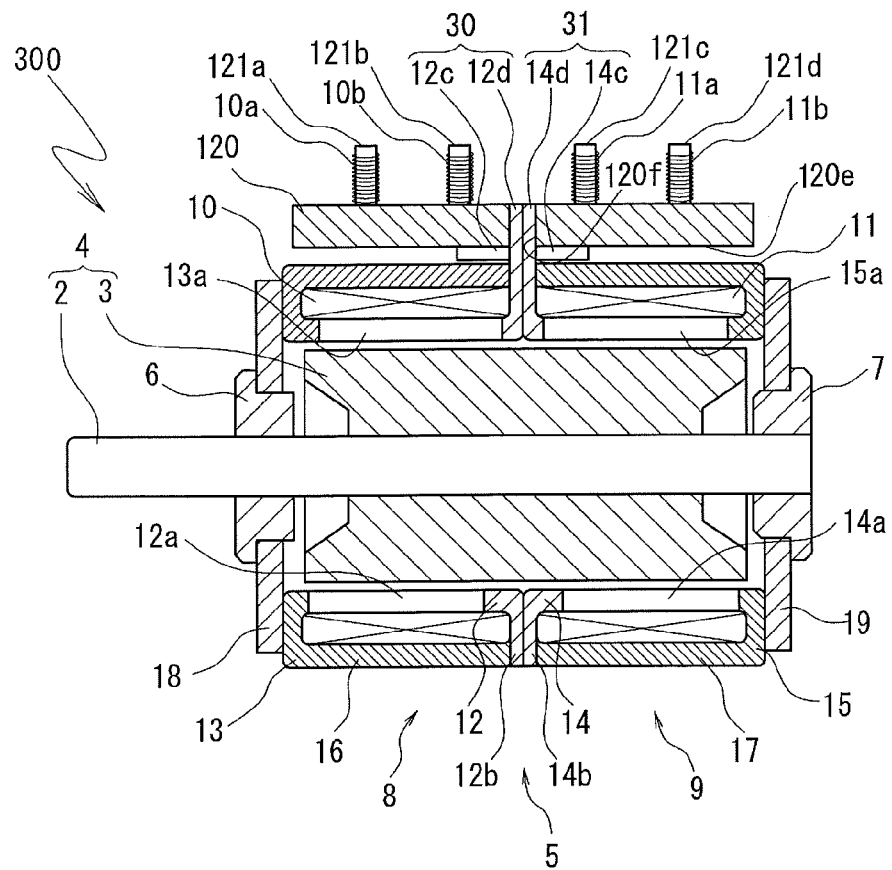
FIG. 12 is a cross sectional side view showing a stepping motor in a modified example in the second embodiment of the present invention.
Figure 13:
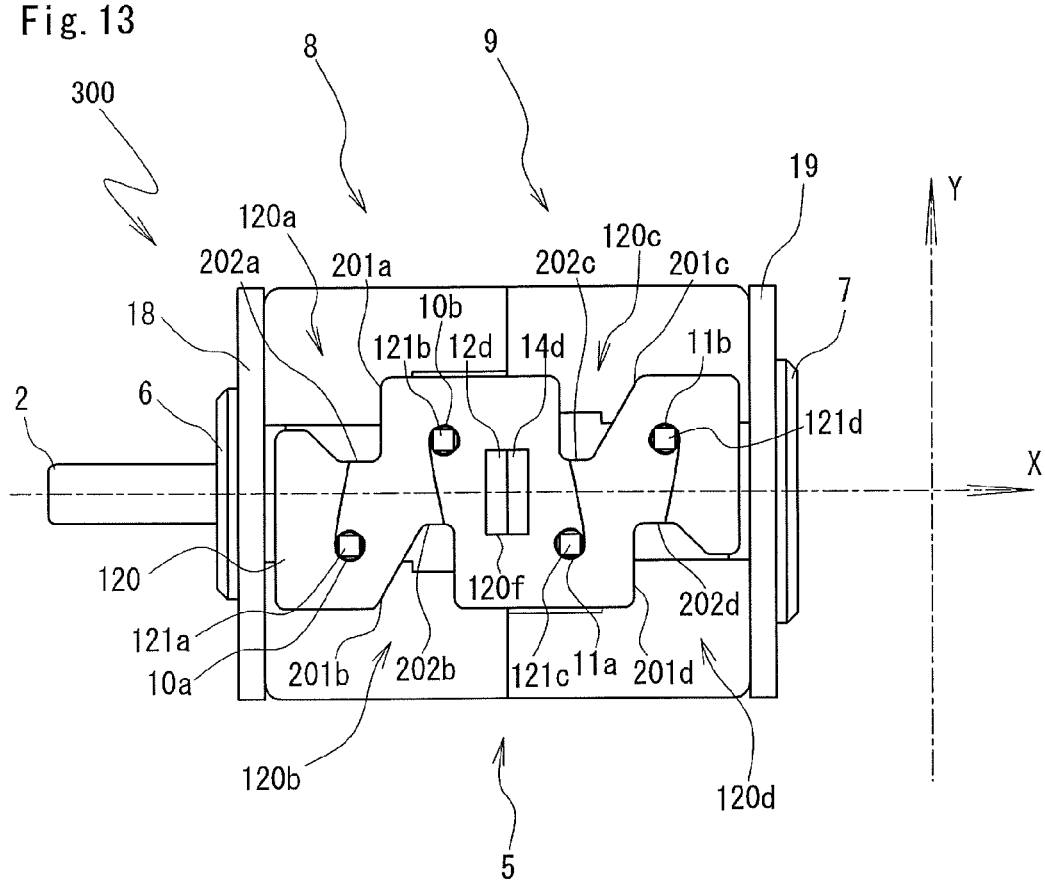
FIG. 13 is a top plan view showing the stepping motor shown in FIG. 12 (in a state where a flexible circuit board is not connected).

Next, a stepping motor 300 in accordance with a modified example in the second embodiment of the present invention will be described below with reference to the accompanying drawings. FIG. 12 is a cross sectional side view schematically showing the stepping motor 300 and FIG. 13 is a top plan view showing the stepping motor 300 (in a state where a flexible circuit board 150 is not connected). A motor structure in the stepping motor 300 is the same as the embodiment shown in FIGS. 9 through 11 and thus the same notational symbols are used for the same structure and their description is omitted and different structure will be described below.

As shown in FIG. 12, the stepping motor 300 includes, similarly to the above-mentioned second embodiment, a rotor 4, which is provided with a rotation shaft 2 and a rotor magnet (permanent magnet) 3 fixed to the rotation shaft 2, and a stator 5 which is oppositely disposed to the rotor magnet 3 through a clearance.

A terminal block 120 is provided with a plurality of terminal pins 121*a* through 121*d* around which coil ends 10*a*, 10*b* and 11*a*, 11*b* drawn from drive coils 10 and 11 are wound, and the terminal block 120 is provided on an outer peripheral side of the stator 5 which is structured as described above.

Similarly to the above-mentioned embodiment, the terminal block 120 is provided with terminal pins 121*a* through 121*d* along the axial direction (X-axis) of the rotation shaft 2. When the terminal pins 121*a* through 121*d* are disposed as described above, distances between the respective terminal pins 121*a* through 121*d* can be increased.

Further, the terminal pins 121*a* through 121*d* are alternately located at up-and-down positions along the X-axis direction with the X-axis as a center (upper and lower directions in FIG. 13) and thus distances between the terminal pins 121*a* through 121*d* can be further increased.

As a member for supporting the terminal block 120, the terminal block holding parts 30 and 31 for fixing the terminal block 120 are provided in flange parts 12*b* and 14*b* of inner stator cores 12 and 14, which structure the stator 5.

In this embodiment (modified example), a structure shown in FIG. 1 and FIGS. 3(*a*) through 3(*c*) is utilized as the terminal block holding parts 30 and 31. In other words, the terminal block holding part 30 formed in the flange part 12*b* of the inner stator core 12 is formed with the first holding part 12*c*, which is bent at a substantially right angle from the flange part 12*b* to be extended in the axial direction for supporting the bottom face 120*e* of the terminal block 120, and the second holding part 12*d* which is extended from the flange part 12*b* in a direction crossing the axial direction to be fitted into the engaging hole 120*f* of the terminal block 120.

Similarly, the terminal block holding part 31 of the inner stator core 14 is formed with the first holding part 14*c*, which is bent at a substantially right angle from the flange part 14*b* to be extended in the axial direction for supporting the bottom face 120*e* of the terminal block 120, and the second holding part 14*d* which is extended from the flange part 14*b* in a direction crossing the axial direction to be fitted into the engaging hole 120*f* of the terminal block 120.

The respective second holding parts 12*d* and 14*d* are formed at a substantially center position of the stator 5 and the first holding parts 12*c* and 14*c* may be basically formed like the structure shown in FIG. 3. However, positions of the terminal pins 121*a* through 121*d* in the terminal block 120 are different from the terminal block 20 provided with the terminal pins 21 through 24 shown in FIGS. 2(*a*) through 2(*c*). Therefore, in consideration of positions of the terminal pins 121*a* through 121*d*, it is preferable that a tip end in the axial direction of the first holding part 12*c* formed in the inner stator core 12 is extended up to a vicinity position or an outer side position in the axial direction with respect to the position of the terminal pin 121*b* and, further, that the first holding part 12*c* is formed so as to support an outer side position of the terminal pin 121*b* in a circumferential direction (up-and-down direction in FIG. 13). Further, it is preferable that a tip end in the axial direction of the first holding part 14*c* formed in the inner stator core 14 is extended up to a vicinity position or an outer side position in the axial direction with respect to the position of the terminal pin 121*c* and, further, that the first holding part 14*c* is formed so as to support an outer side position of the terminal pin 121*c* in the circumferential direction.

As shown in FIG. 12, the inner stator core 12 and the inner stator core 14 are disposed in a back-to-back manner so that the second holding part 12*d* of the inner stator core 12 and the second holding part 14*d* of the inner stator core 14 are just overlapped with each other. The second holding parts 12*d* and 14d in the superposed state are fitted into the engaging hole 120f of the terminal block 120 to fix the terminal block 120 to the terminal block holding parts 30 and 31.

In this embodiment, similarly to the above-mentioned first embodiment, the bottom face 120e of the terminal block 120 is supported by the first holding part 12c provided in the terminal block holding part 30 of the inner stator core 12 and by the first holding part 14c provided in the terminal block holding part 31 of the inner stator core 14.

As described above, the second holding parts 12d and 14d are fitted into the engaging hole 120f of the terminal block 120 and the bottom face 120e of the terminal block 120 is supported by the first holding parts 12c and 14c which are formed to be bent from the flange parts 12b and 14b. Therefore, the terminal block 120 is prevented from being carelessly inclined in the axial line direction and in the direction perpendicular to the axial line direction. As a result, connecting work can be easily performed in which a flexible circuit board is placed on the terminal block 120 and circuit patterns on the flexible circuit board 150 are connected to the terminal pins 121a through 121d.

Figure 14:
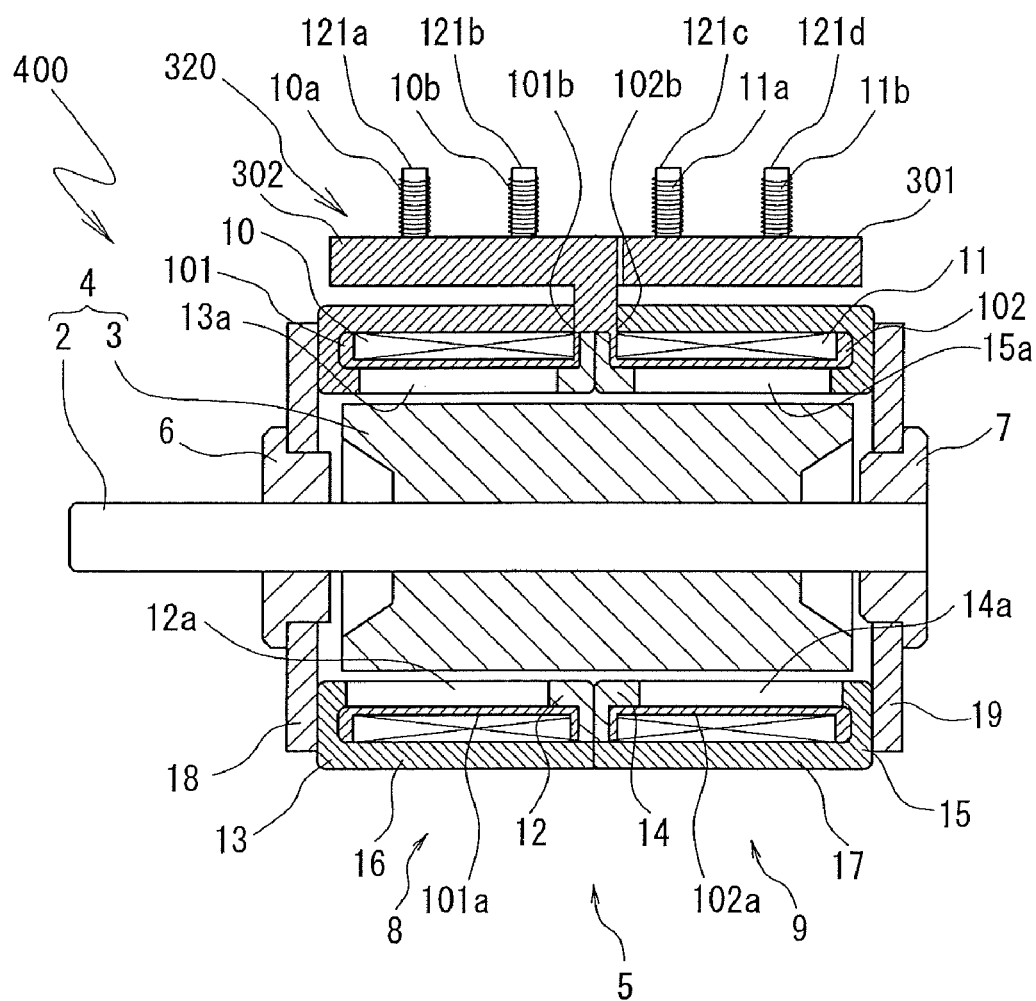
FIG. 14 is a cross sectional side view showing a stepping motor in another modified example in the second embodiment of the present invention.
Figure 15:
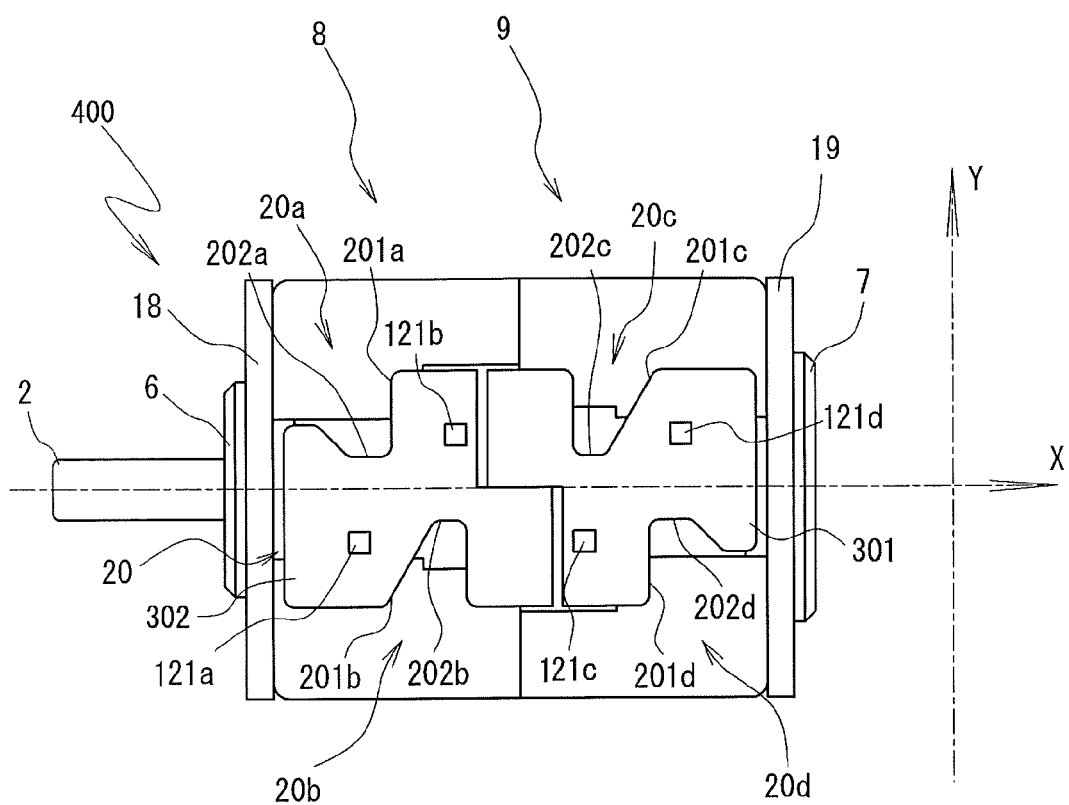
FIG. 15 is a top plan view showing the stepping motor shown in FIG. 14 (in a state where a flexible circuit board is not connected).
Figure 16A:
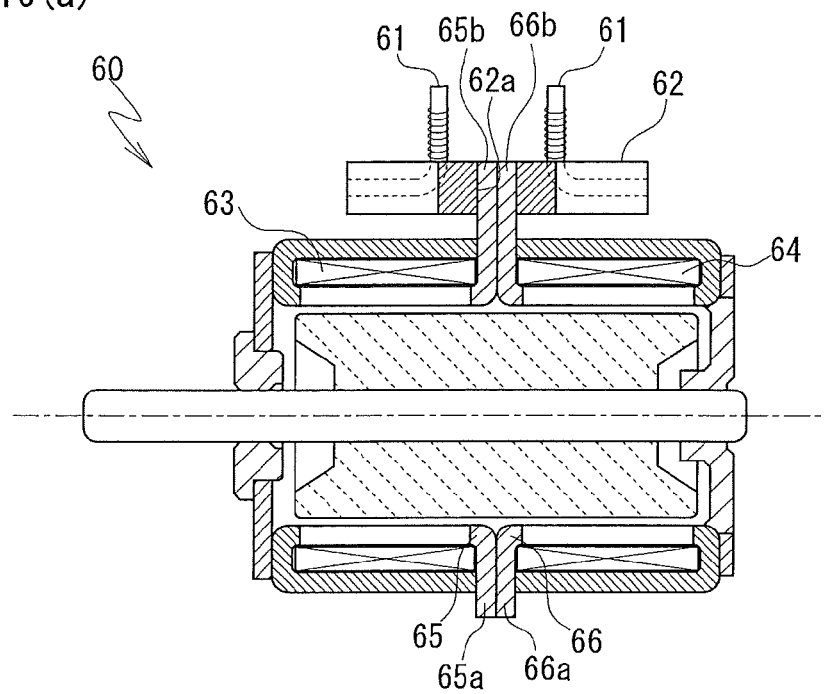
FIG. 16(a) is a cross sectional side view showing a schematic structure of a conventional stepping motor.
Figure 16B:
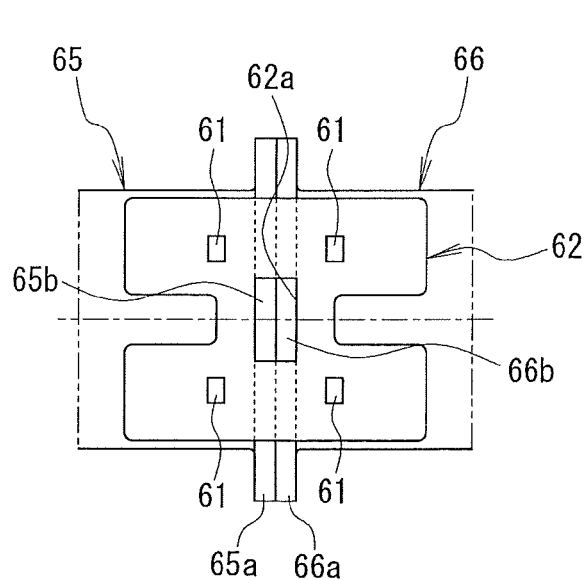
FIG. 16(b) is a top plan view showing a state where a terminal block is fixed to flange parts of inner stator cores.
Figure 16C:
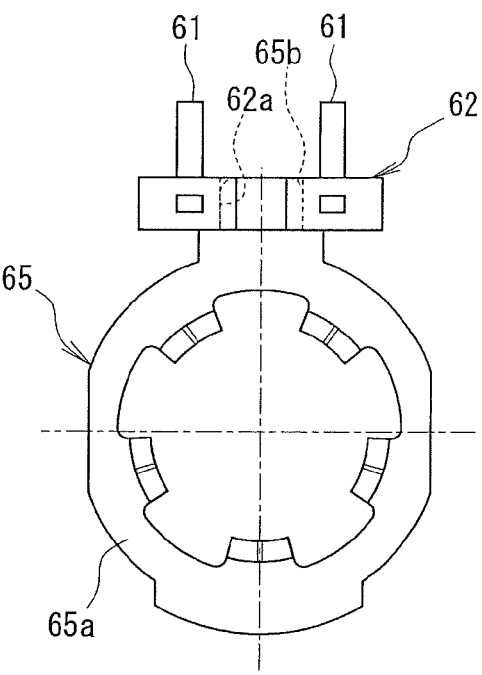
FIG. 16(c) is a front view showing a state where the terminal block is fixed to the flange parts of the inner stator cores.
Figure 17A:
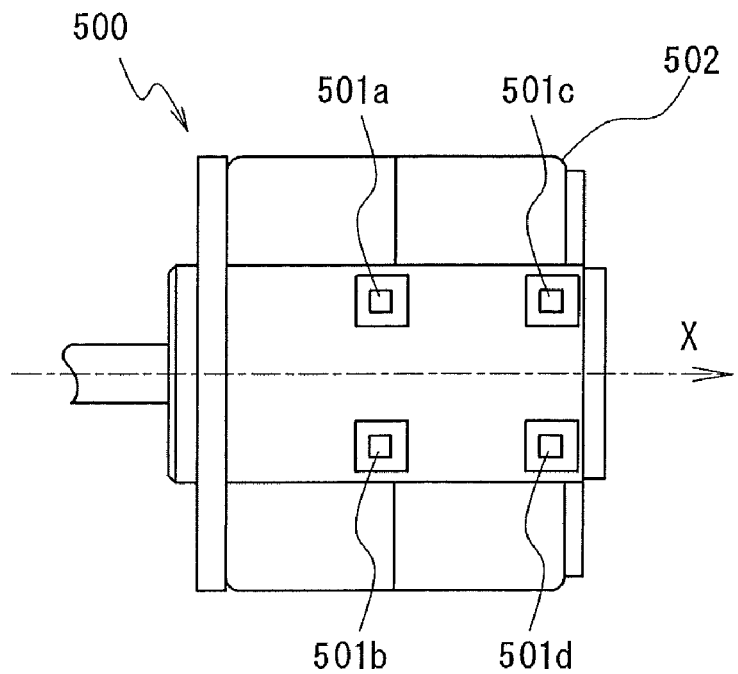
FIG. 17(a) is a top plan view for explaining arrangement structure of terminal pins in a conventional stepping motor.
Figure 17B:
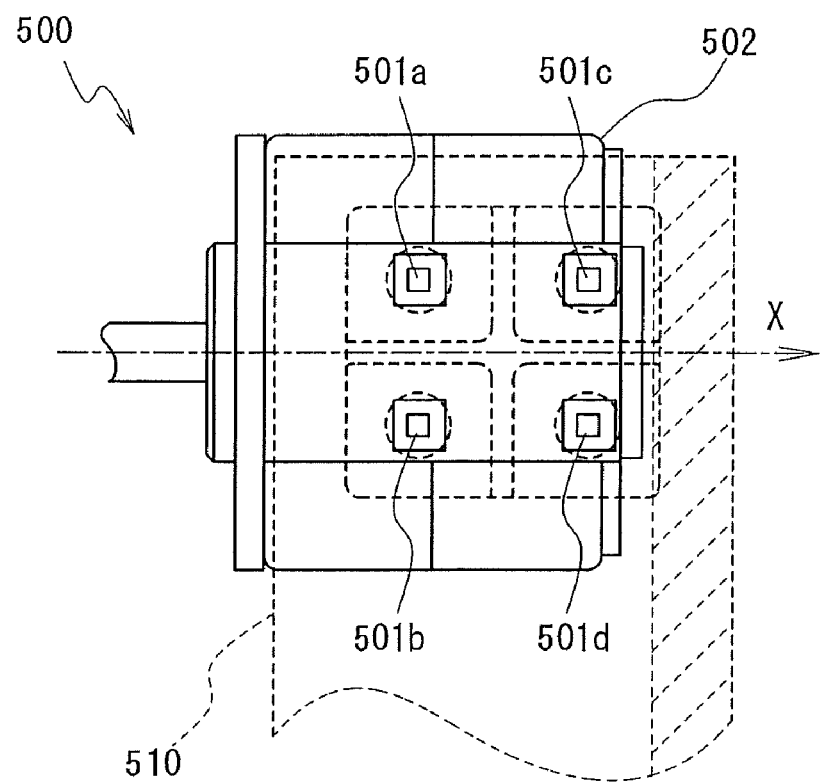
FIG. 17(b) is a top plan view showing a state where a flexible circuit board is connected to the stepping motor.

Next, a stepping motor 400 in accordance with another modified example in the second embodiment of the present invention will be described below with reference to the accompanying drawings. FIG. 14 is a cross sectional side view schematically showing the stepping motor 400 and FIG. 15 is its top plan view (state where a flexible circuit board is not connected). A basic motor structure in the stepping motor 400 is the same as the above-mentioned first embodiment and thus the same notational symbols are used for the same structure and their description is omitted and different structure will be described below.

In this embodiment, drive coils 10 and 11 accommodated in the stator 5 (first stator assembly 8 and second stator assembly 9) are respectively wound around a first coil bobbin 101 and a second coil bobbin 102.

The coil bobbins 101 and 102 include cylindrical parts 101a and 102a around which the drive coils 10 and 11 are wound and flange parts 101b and 102b. A first terminal block 301 and a second terminal block 302 are integrally formed with the flange parts 101b and 102b so as to be bent and extended in an axial direction of the rotation shaft 2 from the flange parts 101b and 102b.

In this embodiment, the first terminal block 301 and the second terminal block 302 are respectively formed to be bent in a separated direction from the coil bobbins 101 and 102. This is because that, if the first terminal block 301 and the second terminal block 302 are formed to be adjacent to the coil bobbins 101 and 102, the first terminal block 301 and the second terminal block 302 cover the cylindrical parts 101a and 102a. Therefore, the first terminal block 301 and the second terminal block 302 hinder winding of a coil wire around the coil bobbins 101 and 102.

When the coil bobbins 101 and 102 formed as described above are disposed on each other in a back-to-back manner, the first terminal block 301 and the second terminal block 302 are, as shown in FIG. 15, engaged with each other to form the terminal block 320. The terminal block 320 is, similarly to the second embodiment, provided with terminal pins 121a through 121d along an axial direction (X-axis) of the rotation shaft 2. According to the structure as described above, distances between the respective terminal pins 121a through 121d can be increased.

Also, similarly to the above-mentioned second embodiment, the terminal pins 121a through 121d are alternately arranged at up-and-down positions (upper and lower direction in FIG. 15) along an X-axis direction with the X-axis as a center and, in this case, distances between the terminal pins 121a through 121d can be further increased.

According to the stepping motor 400 structured as described above, the terminal block 320 is divided into the first terminal block 301 formed in the first coil bobbin 101 and the second terminal block 302 formed in the second coil bobbin 102, which are separately formed from each other and thus assembling of the stepping motor becomes easy. Further, the first terminal block 301 and the second terminal block 302 are integrally formed with the coil bobbins 101 and 102 respectively and thus the terminal block 320 is not required to be mounted as a separate member and manufacturing cost of the stepping motor can be reduced.

As described above, according to the stepping motors 200, 300 and 400 in accordance with the embodiments, the terminal pins 121a through 121d are disposed along the axial direction of the rotation shaft 2 of the stepping motors 200, 300 and 400, sufficient distances can be secured between the respective terminal pins. Therefore, a malfunction is prevented where a nozzle of an automatic coil winding machine for winding the coil ends 10a and 11a of the drive coils 10 and 11 around the terminal pins 121a through 121d can not pass through between the terminal pins 121a through 121d or, where spaces for forming lands "L" having a size required to coat solder can not be secured on the flexible circuit board 150 which is connected to the terminal pins 121a through 121d.

In this case, the first terminal pin 121a (121c) and the second terminal pin 121b (121d) are alternately disposed along the X-axis direction at up-and-down positions (upper and lower direction in FIGS. 10, 13 and 15) in the Y-axis direction perpendicular to the axial direction of the rotation shaft 2. In addition, the terminal pins 121a through 121d are not disposed to be superposed in the Y-axis direction. Therefore, a larger distance can be secured between the first terminal pin 121a (121c) and the second terminal pin 121b (121d).

Further, the first terminal pins 121a and 121c are located on the output side of the second terminal pins 121b and 121d. Further, the flexible circuit board 150, on which the first pin connection holes 151a and 151c and the second pin connection holes 151b and 151d are formed at positions respectively corresponding to the first terminal pins 121a and 121c and the second terminal pins 121b and 121d, are mounted to the first terminal pins 121a and 121c and the second terminal pins 121b and 121d. In addition, distances in the axial direction of the rotation shaft 2 between the end face on the output side of the flexible circuit board 150 and the first pin connection holes 151a and 151c are designed to be smaller than distances between the first terminal pins 121a and 121c and the end face on the output side of the stator 5. Further, distances between the end face on the opposite-to-output side of the flexible circuit board 150 and the second pin connection holes 151b and 151d are designed to be smaller than distances between the second terminal pins 121b and 121d and the end face on the opposite-to-output side of the stator 5. According to the structure as described above, the flexible circuit board 150 mounted on the stepping motors 200, 300 and 400 does not protrude from the stator 5, and thus mounting space of the stepping motors 200, 300 and 400 is prevented from becoming larger due to the flexible circuit board and the size of a device on which the stepping motor 200, 300 and 400 are mounted can be reduced.

Further, according to the stepping motor 300 shown in FIGS. 12 and 13, the inner stator cores 12 and 14 are formed with terminal block holding parts 30 and 31 for holding the terminal block 120. The first holding parts 12c and 14c of the terminal block holding parts 30 and 31 are structured to be extended in the axial direction of the rotation shaft 2 from the outer peripheral end part of the stator 5 to support the bottom face 120e of the terminal block 120. Therefore, inclination of the terminal block 120 is prevented and connecting work in which the flexible circuit board 150 is placed on the terminal block 120 and connected are easily performed.

Further, even when the stepping motors 200, 300 and 400 are provided with the stator 5 which is structured as a two-phase stator that is comprised of the first stator assembly 8 and the second stator assembly 9, the first terminal pins 121a and 121c and the second terminal pins 121b and 121d arranged in the corresponding stator assemblies 8 and 9 are disposed in the terminal block 120 along the axial direction of the rotation shaft 2 and thus distances between the respective terminal pins 121a through 121d can be sufficiently secured. Especially, like this embodiment, when the terminal pins 121a and 121d which are located on the outer side in the respective stator assemblies 8 and 9 are disposed on the outer sides of the center positions in the axial direction in the respective stator assemblies 8 and 9, sufficient distances between the respective terminal pins 121a through 121d can be secured.

In addition, in this embodiment, the first terminal pin 121a and the second terminal pin 121b arranged in the first stator assembly 8, and the first terminal pin 121c and the second terminal pin 121d arranged in the second stator assembly 9 are respectively disposed at different positions in the direction (Y-axis direction) which is perpendicular to the axial direction of the rotation shaft 2 (X-axis direction). Specifically, they are disposed at the positions away from the X-axis with a substantially equal distance in the Y-axis direction. According to this structure, in the stepping motors 200, 300 and 400 having the two-phase stator, larger distances are secured between the respective terminal pins 121a through 121d.

Further, according to the above-mentioned stepping motor 400, the terminal block 320 is comprised of the first terminal block 301 arranged in the first stator assembly 8 (coil bobbin 101) and the second terminal block 302 arranged in the second stator assembly 9 (coil bobbin 102), and the first terminal block 301 and the second terminal block 302 are formed separately. According to the structure as described above, assembling of the stepping motor 400 becomes easy and its manufacturing cost can be reduced.

The present invention has been described in detail by using the embodiments, but the present invention is not limited to the embodiments described above and many modifications can be made without departing from the subject matter of the present invention. For example, the stepping motor described above is a motor having a two-phase structure but the present invention may be applied to a motor having a single-phase structure or a three or more-phase structure.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stepping motor comprising:
   a rotor having a rotation shaft and a permanent magnet provided on an outer periphery of the rotation shaft;
   a stator provided with a stator core which is formed with a flange part and pole teeth;
   a drive coil which is disposed on an outer peripheral side of the pole teeth; and
   a terminal block which is disposed on an outer peripheral side of the stator;
   wherein the flange part of the stator core is provided with a terminal block holding part for holding the terminal block, and
   wherein the terminal block holding part is formed with a first holding part, which is formed to be bent from the flange part and extended in an axial direction of a motor, for supporting a bottom face of the terminal block.

2. The stepping motor according to claim 1, wherein the terminal block holding part is formed with a second holding part which is extended from the flange part in a direction crossing the axial direction for supporting the terminal block.

3. The stepping motor according to claim 2, wherein the first holding part and the second holding part are formed of the stator core so as to be extended from the flange part.

4. The stepping motor according to claim 3, wherein
   the first holding part and the second holding part are formed on the same side of the flange part, and
   the second holding part is formed on a center side of the terminal block holding part, and
   the first holding part is formed to be bent in the axial direction of the motor at a position which is different from the second holding part in a circumferential direction.

5. The stepping motor according to claim 4, wherein
   the terminal block is formed with an engaging hole into which the second holding part is fitted, and
   the terminal block is mounted on the flange part of the stator core in a state that the first holding part abuts with the bottom face of the terminal block and the bottom face of the terminal block is supported by the first holding part when the second holding part is engaged with the engaging hole.

6. The stepping motor according to claim 5, further comprising a stepped part which is formed in the terminal block holding part near the second holding part,
   wherein a tip end of the stepped part is used for supporting the bottom face of the terminal block together with the first holding part.

7. The stepping motor according to claim 3, wherein the first holding part of the terminal block holding part is extended from the flange part in the same direction as the pole teeth.

8. The stepping motor according to claim 1, wherein the stator comprises two stator assemblies, and the terminal block holding part provided with the first holding part is formed in the respective flange parts of the stator cores of the two stator assemblies.

9. The stepping motor according to claim 8, wherein
   each of the two stator assemblies comprises an inner stator core and an outer stator core which sandwiches the drive coil with the inner stator core,
   the two inner stator cores are disposed on each other in a back-to-back manner, and
   each of the two inner stator cores is formed with the first holding part and a second holding part which is extended from the flange part in a direction crossing the axial direction for supporting the terminal block.

10. The stepping motor according to claim 9, wherein
    an engaging hole into which the second holding parts provided in the two inner stator cores are fitted is formed at a center of the terminal block, coil winding parts of a plurality of terminal pins, which are connected to the drive coils of the two stator assemblies, are provided on both side positions in the axial direction of the engaging hole in the terminal block, when the two inner stator cores are disposed on each other in the back-to-back manner, the second holding parts formed in the respective two inner stator cores structure one second holding part to be fitted into the engaging hole of the terminal block, and the first holding parts formed in the two inner stator cores are respectively formed in opposite directions to each other in the axial direction so as to interpose the second holding part, and the bottom face of the terminal block is supported by the two first holding parts at both side positions in the axial direction of the engaging hole of the terminal block.

11. The stepping motor according to claim 10, wherein the first holding part which is provided in each of the two inner stator cores is extended to a position of the coil winding part of the terminal pin which is provided on both side positions in the axial direction of the engaging hole.

12. The stepping motor according to claim 11, wherein
a tip end in the axial direction of the first holding part is extended on an outer side in the axial direction of the coil winding part of the terminal pin, and
the first holding part is formed so as to support the terminal block at an outer side position of the coil winding part in a circumferential direction.

13. A stepping motor comprising:
a rotor having a rotation shaft and a permanent magnet provided on an outer periphery of the rotation shaft;
a stator provided with a stator core which is formed with pole teeth;
a drive coil which is disposed on an outer periphery of the pole teeth;
a terminal block which is disposed on an outer peripheral side of the stator; and
a plurality of terminal pins which are arranged in the terminal block;
wherein
the plurality of the terminal pins comprises a first terminal pin around which one end of the drive coil is wound and a second terminal pin around which an other end of the drive coil is wound, and the first terminal pin and the second terminal pin are disposed in the terminal block along an axial direction of the rotation shaft,
the terminal block is formed on its peripheral portion with a first cut-out part corresponding to the first terminal pin and a second cut-out part corresponding to the second terminal pin,
the first cut-out part and the second cut-out part are formed in the terminal block at neighboring positions of the corresponding terminal pins in the direction perpendicular to the axial direction of the rotation shaft, and
the one end of the drive coil is drawn through the first cut-out part and wound around the first terminal pin and the other end of the drive coil is drawn through the second cut-out part and wound around the second terminal pin.

14. The stepping motor according to claim 13, wherein the first terminal pin and the second terminal pin are disposed at different positions in a direction perpendicular to the axial direction of the rotation shaft.

15. The stepping motor according to claim 14, wherein the first terminal pin and the second terminal pin are disposed at different positions in the direction perpendicular to the axial direction of the rotation shaft so as to interpose the axial line of the rotation shaft therebetween.

16. The stepping motor according to claim 13, wherein the first cut-out part and the second cut-out part are formed in a tapered shape becoming narrower from the peripheral portion of the terminal block toward the terminal pin.

17. The stepping motor according to claim 16, wherein
the first terminal pin and the second terminal pin are disposed at different positions in the direction perpendicular to the axial direction of the rotation shaft so as to interpose the axial line of the rotation shaft therebetween,
the first cut-out part and the second cut-out part formed in the terminal block are cut in opposite directions to each other in a circumferential direction at the positions corresponding to the first terminal pin and the second terminal pin, and
the one end and the other end of the drive coil are drawn in the opposite directions to each other in the circumferential direction to be wound around the first terminal pin and the second terminal pin.

18. A stepping motor comprising:
a rotor having a rotation shaft and a permanent magnet provided on an outer periphery of the rotation shaft;
a stator provided with a stator core which is formed with pole teeth;
a drive coil which is disposed on an outer periphery of the pole teeth;
a terminal block which is disposed on an outer peripheral side of the stator; and
a plurality of terminal pins which are arranged in the terminal block;
wherein
the plurality of the terminal pins comprises a first terminal pin around which one end of the drive coil is wound and a second terminal pin around which an other end of the drive coil is wound, and the first terminal pin and the second terminal pin are disposed in the terminal block along an axial direction of the rotation shaft,
the first terminal pin is located on an output side of the second terminal pin, and
the first terminal pin and the second terminal pin are connected to a power supply board on which a first pin connection hole and a second pin connection hole are formed at positions corresponding to the first terminal pin and the second terminal pin, and
a distance between an end face on an output side of the power supply board in the axial direction of the rotation shaft and the first pin connection hole, and a distance between an end face on an opposite-to-output side of the power supply board and the second pin connection hole are set to be smaller than a distance between an end face on an output side of the stator and the first terminal pin, and a distance between an end face on an opposite-to-output side of the stator and the second terminal pin.

19. A stepping motor comprising:
a rotor having a rotation shaft and a permanent magnet provided on an outer periphery of the rotation shaft;
a stator provided with a stator core which is formed with pole teeth;
a drive coil which is disposed on an outer periphery of the pole teeth;
a terminal block which is disposed on an outer peripheral side of the stator;
a plurality of terminal pins which are arranged in the terminal block; and a terminal block holding part for holding the terminal block which is formed in the stator core;

wherein the plurality of the terminal pins comprises a first terminal pin around which one end of the drive coil is wound and a second terminal pin around which an other end of the drive coil is wound, and the first terminal pin and the second terminal pin are disposed in the terminal block along an axial direction of the rotation shaft, and the terminal block holding part is extended from an outer peripheral part of the stator in the axial direction of the rotation shaft so as to abut with a bottom face of the terminal block to prevent inclination in the axial direction of the terminal block.

20. A stepping motor comprising:

a rotor having a rotation shaft and a permanent magnet provided on an outer periphery of the rotation shaft;

a stator provided with a stator core which is formed with pole teeth;

a drive coil which is disposed on an outer periphery of the pole teeth;

a terminal block which is disposed on an outer peripheral side of the stator;

a plurality of terminal pins which are arranged in the terminal block;

wherein the plurality of the terminal pins comprises a first terminal pin around which one end of the drive coil is wound and a second terminal pin around which an other end of the drive coil is wound, and the first terminal pin and the second terminal pin are disposed in the terminal block along an axial direction of the rotation shaft, the stator comprises two stator assemblies, the first terminal pin and the second terminal pin arranged in one of the two stator assemblies, and the first terminal pin and the second terminal pin arranged in the other of the two stator assemblies are respectively disposed in the terminal block along the axial direction of the rotation shaft, the terminal block is formed of a first terminal block, which is disposed in the one of the two stator assemblies, and a second terminal block which is disposed in the other of the two stator assemblies, and the first terminal block and the second terminal block are formed separately from each other.

21. The stepping motor according to claim 20, wherein the first terminal pin and the second terminal pin arranged in the one of the two stator assemblies, and the first terminal pin and the second terminal pin arranged in the other of the two stator assemblies are disposed at different positions in a direction perpendicular to the axial direction of the rotation shaft.

22. The stepping motor according to claim 21, wherein the first terminal pins and the second terminal pins of the two stator assemblies are respectively disposed at different positions in the direction perpendicular to the axial direction of the rotation shaft so as to interpose the axial line of the rotation shaft therebetween.

* * * * *